United States Patent
Iga et al.

[11] Patent Number: 5,831,658
[45] Date of Patent: Nov. 3, 1998

[54] PRINTER DEVICE AND METHOD FOR PRINTING DEVIATION TEST PATTERNS TO MEASURE DEVIATIONS OF PRINTING POSITIONS

[75] Inventors: Kaname Iga; Takashi Ichikawa, both of Shizuoka-ken; Noriyasu Fujii, Numazu, all of Japan

[73] Assignee: Kabushiki Kaisha TEC, Shizuola, Japan

[21] Appl. No.: 623,427

[22] Filed: Mar. 28, 1996

[30] Foreign Application Priority Data

Mar. 30, 1995 [JP] Japan ................................ 7-074003

[51] Int. Cl.⁶ ................................ B41J 2/315; B41J 2/32
[52] U.S. Cl. ................................ 347/171
[58] Field of Search ................ 347/19, 171, 172, 347/175, 177, 179; 400/555

[56] References Cited

U.S. PATENT DOCUMENTS 4,685,702  8/1987  Kazuharu .
5,059,984  10/1991  Moore et al. ................ 347/41
5,069,556  12/1991  Sasaki et al. ................ 347/19 X
5,207,516  5/1993  Suzuki ................ 400/555

FOREIGN PATENT DOCUMENTS

0076948 A2  4/1983  European Pat. Off. .
4-153053    5/1992  Japan .
5-344302   12/1993  Japan .
WO 92/01264  1/1992  WIPO .

*Primary Examiner*—Edward Tso
*Attorney, Agent, or Firm*—Frishauf, Holtz, Goodman, Langer & Chick

[57] ABSTRACT

A deviation test pattern includes a reference scale printed by one reference printing unit among a plurality of printing units arranged to print overlaid images of yellow, magenta, cyan and black. The reference scale has a plurality of scale bars arranged in a main-scanning direction at a pitch of 30 dots. Particularly, the deviation test pattern further includes a difference scale printed adjacent to and in parallel to the reference scale by a printing unit other than the reference printing unit. The difference scale has a plurality of scale bars arranged in the main-scanning direction at a pitch of 29 dots (or 31 dots).

17 Claims, 15 Drawing Sheets

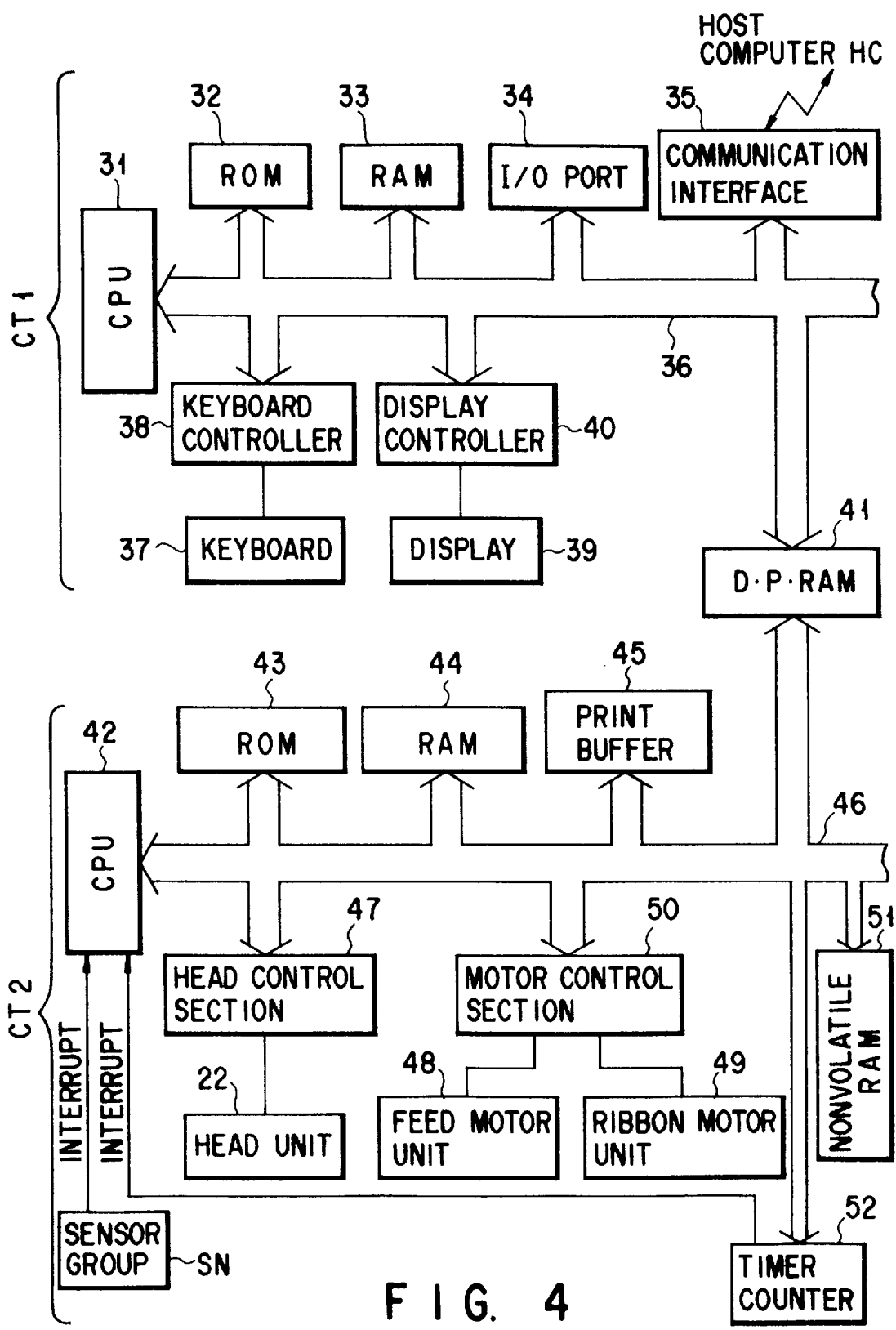
F I G. 4

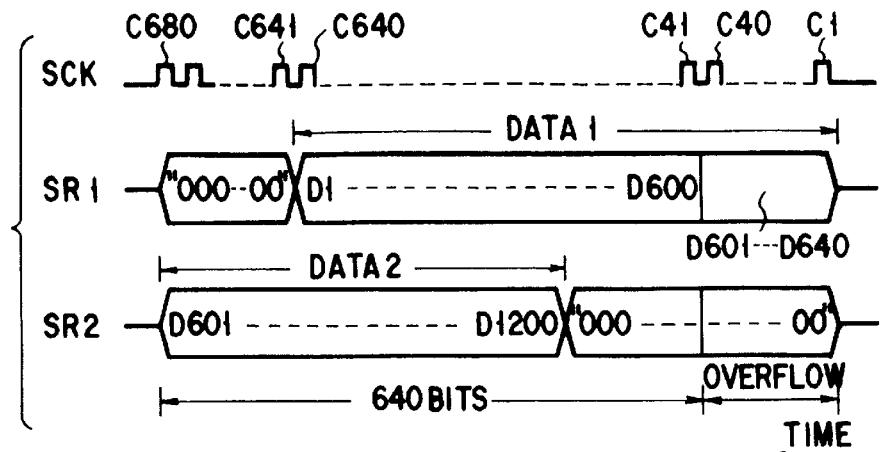
F I G. 13
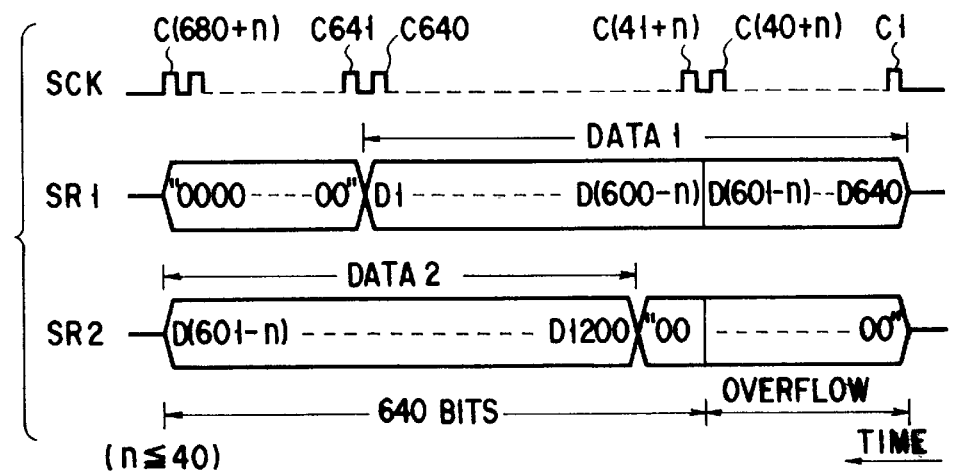
F I G. 14
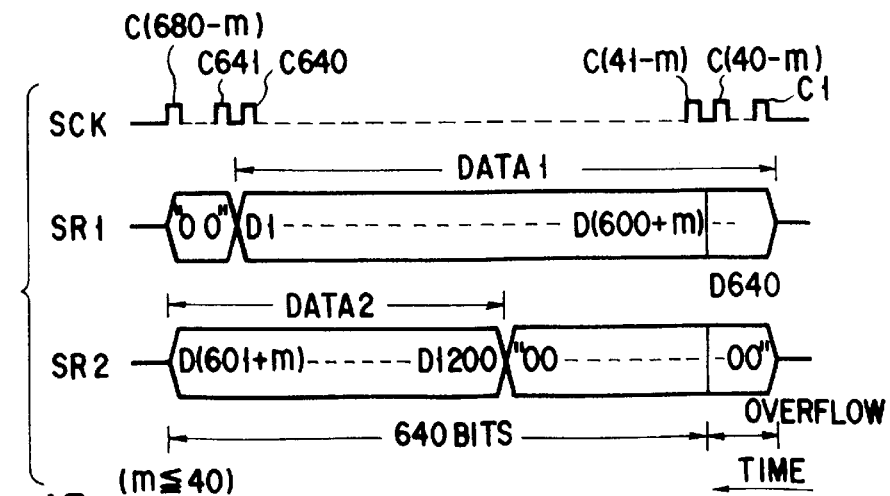
F I G. 15

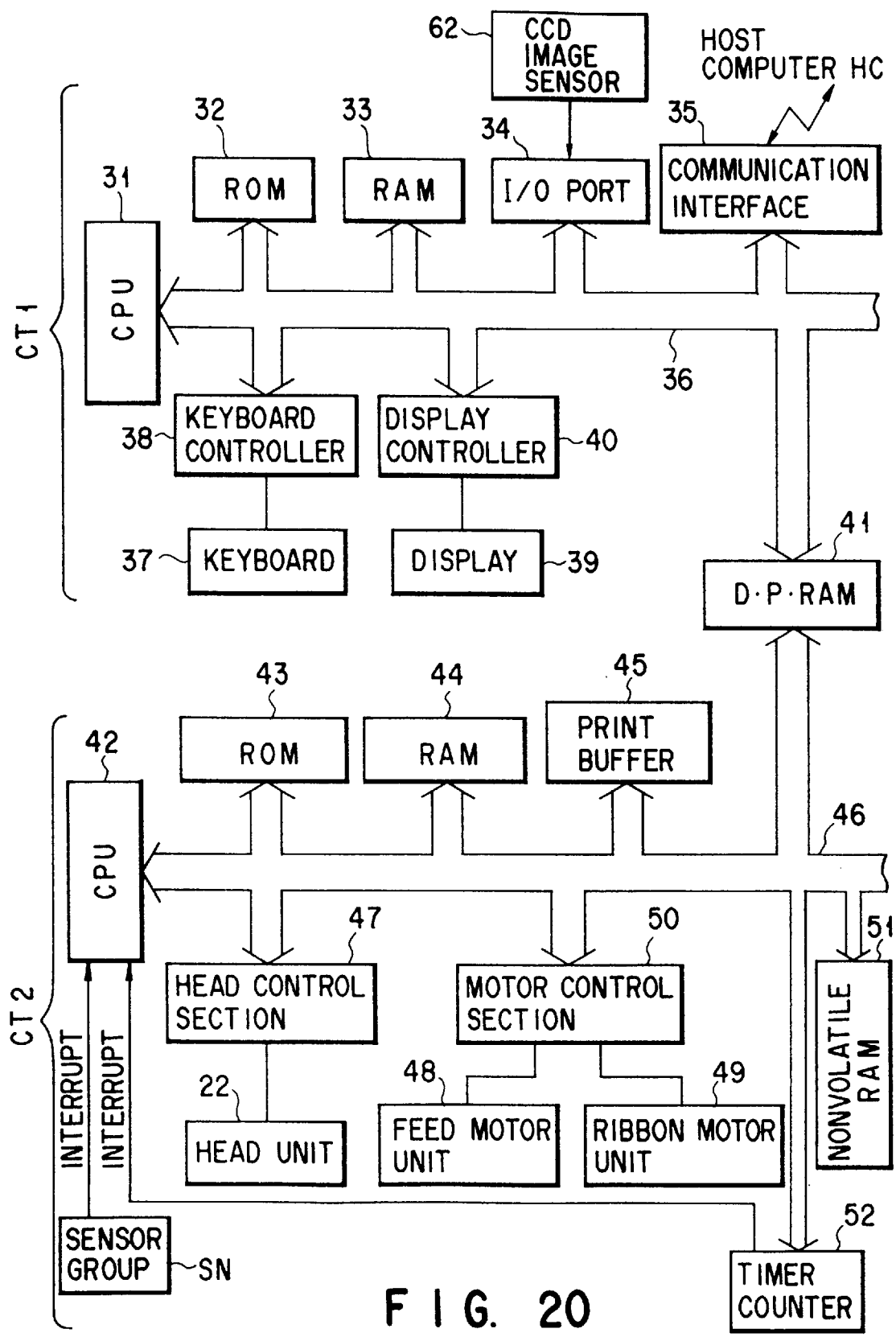
F I G. 20

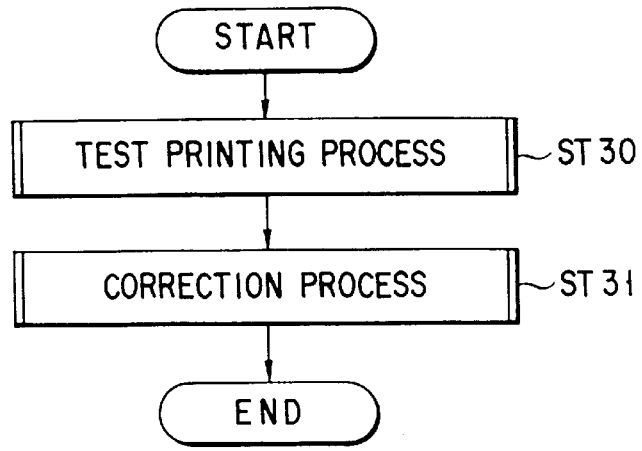
F I G. 21
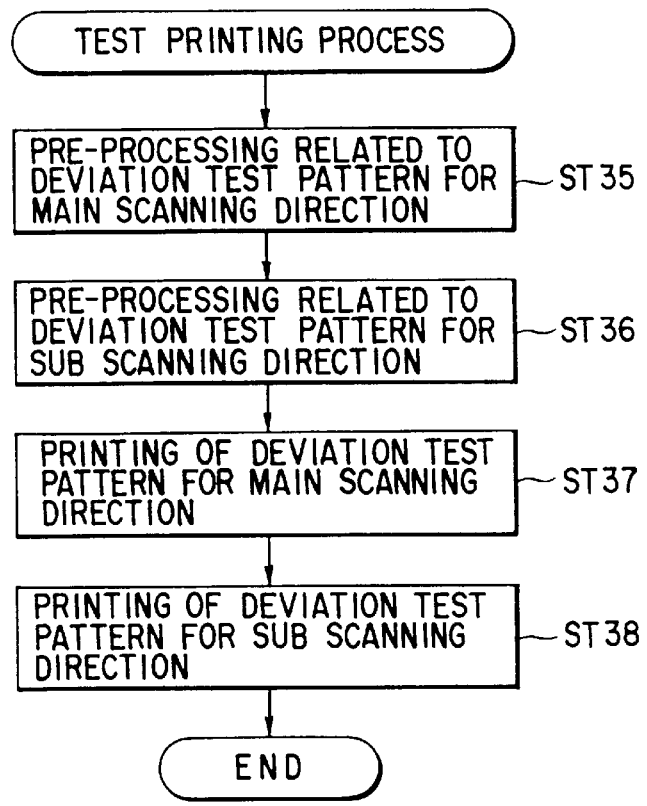
F I G. 22

PRINTER DEVICE AND METHOD FOR PRINTING DEVIATION TEST PATTERNS TO MEASURE DEVIATIONS OF PRINTING POSITIONS

Background of the Invention

1. Field of the Invention

The present invention generally relates to a printer device for printing a plurality of images laid over paper, and more particularly to a printer device which can be used to form a color image whose color components correspond to colors of the images.

2. Description of the Related Art

A typical label-making color printer includes four printing units, each of which prints a color image using yellow, magenta, cyan and black thermally fusible ink ribbons, respectively. The printing units form a color image by printing color component images of the colors to be overlaid on paper conveyed along a paper feed path. Each printing unit has a platen roller which is disposed perpendicular to the paper feed path to feed the paper and a thermal printing head which is pressed to set the thermally fusible ink ribbon of the corresponding color to be in contact with the paper on the platen roller. Each thermal printing head has a plurality of heat generating elements of dots arranged in a line to face the corresponding platen roller. The ink of the ink ribbon is thermally fused in units of a dot by the heat generating elements and fixed to the paper by pressure.

In the color printer mentioned above, it is required that four color component images are properly overlaid in order to form a color image. Printing positions of the color component images may be relatively deviated from each other due to a mechanical factor, such as molding and mounting of the components or an electrical factor, such as an error in the print timing control. The deviation results in a mixture error of colors in which the printed dots do not completely lay over the other printed dots. The mixture error of colors is not fully prevented in the manufacturing line since accuracy in mounting of the thermal printing head is limited, for example.

In the conventional product inspection, an operator instructs the color printer to print deviation test patterns, and checks these patterns with a microscope or the like to measure relative deviations or errors between the positions of the color component images. FIG. 1 shows a first deviation test pattern printed to measure a positional error occurring in the main-scanning direction X perpendicular to the paper feed path. FIG. 2 shows a second deviation test pattern printed to measure a positional error occurring in the sub-scanning direction P parallel to the paper feed path. Each of the first and second deviation test patterns is composed of a black bar 11, a yellow bar 12, a magenta bar 13 and a cyan bar 14. The black bar 11 serves as a reference bar having a length longer than the sum of the lengths of the bars 12, 13 and 14. The bars 12, 13 and 14 are parallel to the black bar 11 and spaced from the black bar 11 by a predetermined distance D. The bars 11, 12, 13 and 14 extend perpendicular to the main-scanning direction X in the first deviation pattern, whereas they extend perpendicular to the sub-scanning direction P in the second deviation pattern. The yellow bar 12, the magenta bar 13 and the cyan bar 14 must be formed at positions indicated by broken lines shown in FIGS. 1 and 2 and preset according to the distance D. However, there is a case where these bars are actually printed at positions indicated by continuous lines deviated from the preset positions. The foregoing positional error is measured as a difference between the predetermined distance D and the distance from the bar 11 to each of the bars 12 to 14, and corrected by adjusting the printing positions of the bars 12, 13 and 14 with respect to that of the bar 11 such that the difference is eliminated.

However, the aforementioned inspection scheme has a problem that the positional error cannot easily be measured without a tool such as a microscope or the like. Use of the microscope increases strain and fatigue on the operator. Moreover, the accuracy in adjusting the printing positions and the time required to perform the adjustment depends upon the skill of the operator.

SUMMARY OF THE INVENTION

A first object of the present invention is to provide a deviation test pattern and a method of printing the deviation test pattern which enables to easily and accurately measure deviations or errors in the printing positions of images overlaid on paper.

A second object of the present invention is to provide a printer device capable of printing the foregoing deviation test pattern.

A third object of the present invention is to provide a printer device capable of automatically correcting the deviations or errors in the printing positions of images overlaid on paper by using the deviation test pattern.

The first object can be achieved by a deviation test pattern comprising: a reference scale printed by one reference printing unit among a plurality of printing units arranged to print overlaid images, the reference scale having a plurality of scale bars arranged in a deviation-measuring direction at a pitch M; and a difference scale printed adjacent to and in parallel to the reference scale by a printing unit other than the reference printing unit, the difference scale having a plurality of scale bars arranged in the deviation-measuring direction at a pitch N, which slightly differs from the pitch M.

The first object can be also achieved by a method of printing a deviation test pattern comprising the steps of: printing a reference scale by one reference printing unit among a plurality of printing units arranged to print overlaid images, the reference scale having a plurality of scale bars arranged in a deviation-measuring direction at a pitch M; and printing a difference scale adjacent to and in parallel to the reference scale by a printing unit other than the reference printing unit, the difference scale having a plurality of scale bars arranged in the deviation-measuring direction at a pitch N, which slightly differs from the pitch M; thereby obtaining a deviation test pattern formed of the reference scale and the difference scale.

The second object can be achieved by a printer device comprising: a plurality of printing units arranged to print overlaid images; and a print control circuit for controlling the printing units to print the overlaid images, wherein the print control circuit has a test control circuit for controlling one reference printing unit among the plurality of printing units in a test mode to print a reference scale having a plurality of scale bars arranged in a deviation-measuring direction at a pitch M, and controlling a printing unit other than the reference printing unit in the test mode to print a difference scale adjacent to and in parallel to the reference scale and having scale bars arranged in the deviation-measuring direction at a pitch N, which slightly differs from the pitch M; thereby obtaining a deviation test pattern formed of the reference scale and the difference scale.

The third object can be achieved by a printer device comprising: a plurality of printing units arranged to print overlaid images; and a print control circuit for controlling the printing units to print the overlaid images, wherein the print control circuit has a test control circuit for controlling one reference printing unit among the plurality of printing units in a test mode to print a reference scale having a plurality of scale bars arranged in a deviation-measuring direction at a pitch M, controlling a printing unit other than the reference printing unit in the test mode to print a difference scale adjacent to and in parallel to the reference scale and having scale bars arranged in the deviation-measuring direction at a pitch N, which slightly differs from the pitch M, measuring a deviation of a printing position of the other printing unit with respect to a printing position of the reference printing unit in the deviation-measuring direction from a deviation test pattern formed of the reference scale and the difference scale, and changing the printing position of the other printing unit in accordance with a result of the measurement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing a control circuit of the color printer shown in FIG. 3;

FIG. 13 is a time chart showing an operation of a head controller shown in FIG. 5 which is performed when no positional error exists in the main-scanning direction;

FIG. 14 is a time chart showing an operation of the head controller shown in FIG. 5 which is performed when a positional error in the main-scanning direction is corrected by increasing the number of shift clocks;

FIG. 15 is a time chart showing an operation of the head controller shown in FIG. 5 which is performed when a positional error in the main-scanning direction is corrected by decreasing the number of shift clocks;

FIG. 20 is a block diagram showing a control circuit of the color printer shown in FIG. 19;

FIG. 21 is a flowchart for explaining an operation of the control circuit shown in FIG. 20;

FIG. 22 is a flowchart of a test printing process shown in FIG. 21, in detail.

DETAILED DESCRIPTION OF THE PREFERRED EMBODIMENTS

A color printer according to an embodiment of the present invention will now be described with reference to the accompanying drawings. The color printer is used as a printer device which prints a plurality of color component images to be overlaid on label paper or tag paper to obtain a color image formed of the color component images. The label paper is a sheet having a plurality of labels serving as available areas and arranged in series in such a manner that a gap is formed between adjacent two labels. The tag paper is a sheet having a plurality of tags serving as available areas and arranged in series, each tag having a mark previously printed on the rear surface thereof.

Figure 1:
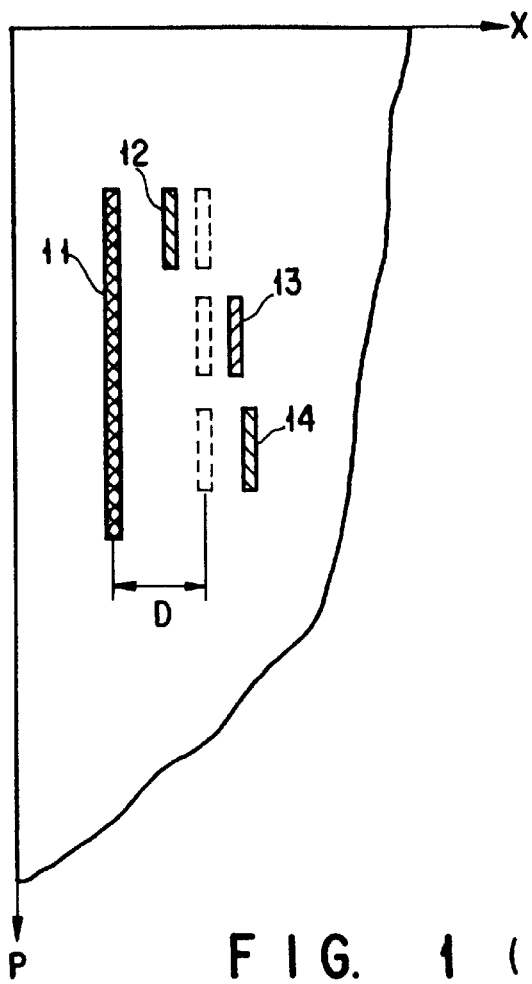
FIG. 1 is a view showing a conventional first deviation test pattern printed in order to measure positional errors in the main-scanning direction.
Figure 2:
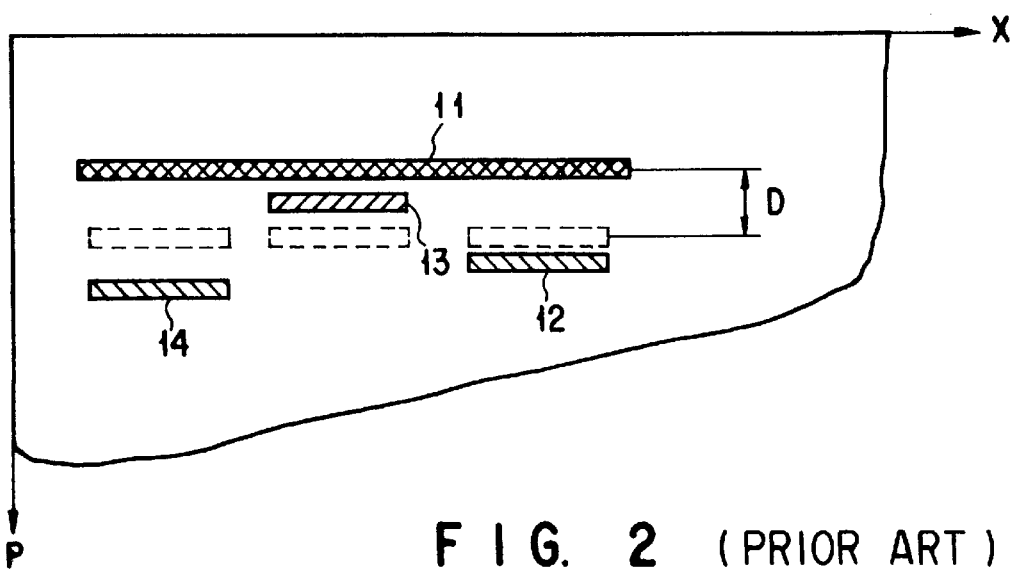
FIG. 2 is a view showing a conventional second deviation test pattern printed in order to measure positional errors in the sub-scanning direction.
Figure 3:
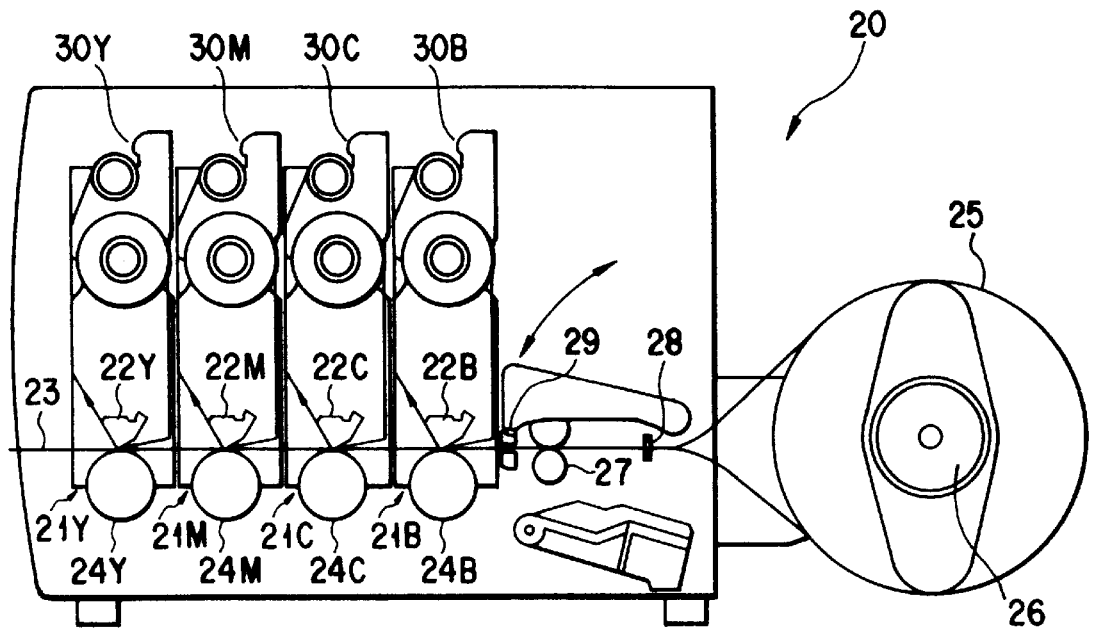
FIG. 3 is a view schematically showing the internal structure of a color printer according to one embodiment of the present invention.

FIG. 3 schematically shows the internal structure of the color printer 20. The color printer 20 has four printing units 21Y, 21M, 21C and 21B, a paper holder 26, a pair of feed rollers 27, a paper empty sensor 28 and a position sensor 29. The paper holder 26 rotatably supports a roll 25 of label paper or tag paper. The pair of feed rollers 27 draw the paper from the paper holder 26 to supply the paper to a paper feed path 23. The printing units 21Y, 21M, 21C and 21B are arranged on the paper feed path 23 at the same intervals such that the printed dot lines is set in parallel with each other, and form a color image by printing yellow, magenta, cyan and black color component images to be overlaid on one available area of the paper which is fed along the paper feed path 23. The paper empty sensor 28 senses empty of the paper at a position between the paper holder 26 and the pair of feed rollers 27 to sense empty of the paper. For example, the paper empty sensor 28 has an end sensor of a light-transmission type by which the rear end of the paper is sensed to determine the empty of the paper. The position sensor 29 senses a position of an available area of the paper located between the printing unit 21B and the feed rollers 27. For example, the position sensor 29 has a gap sensor of a light-transmission type which senses a gap to determine the position of the available area when the label paper is used, and a mark sensor of a light-reflection type which senses a mark to determine the position of the available area when the tag paper is used.

The printing units 21Y, 21M, 21C and 21B include thermal printing heads 22Y, 22M, 22C and 22B, platen rollers 24Y, 24M, 24C and 24B and ribbon magazines 30Y, 30M, 30C and 30B, respectively. The platen rollers 24Y, 24M, 24C and 24B are disposed perpendicular to the paper feed path 23 and rotates together with the pair of feed rollers 27 so as to feed the paper to the exit end of the paper feed path 23. The ribbon magazines 30Y, 30M, 30C and 30B. and are detachably mounted on the printing units 21Y, 21M, 21C and 21B, and yellow, magenta, cyan and black thermally fusible ink ribbons are accommodated in the ribbon magazines 30Y, 30M, 30C and 30B, respectively. These ink ribbons are fed from the ribbon magazines 30Y, 30M, 30C and 30B to the thermal printing heads 22Y, 22M, 22C and 22B. The thermal printing heads 22Y, 22M, 22C and 22B are pressed to set the ink ribbons to be in contact with the paper on the platen rollers 24Y, 24M, 24C and 24B. Each of the thermal printing heads 22Y, 22M, 22C and 22B has a plurality of heat generating elements of dots formed in a line to face a corresponding one of the platen rollers 24Y, 24M, 24C and 24B, and prints a color component image of a corresponding color by thermally fusing ink of the ink ribbon in units of a dot serving as a pixel and fixing the fused ink to the paper by pressure.

FIG. 4 shows a control circuit of the color printer 20. The control circuit includes a system controller CT1 and a print controller CT2 which are operable simultaneously and in parallel.

The system controller CT1 includes a CPU 31 for controlling the whole operation of the color printer 20; a ROM 32 storing a control program of the CPU 31 and other fixed data; a RAM 33 for temporarily storing data input to and output from the CPU 31; an input and output port 34 for establishing a connection between the CPU 31 and a variety of peripheral devices; a communication interface 35 for receiving printing data, print size data, print format data and the like supplied from an external host computer HC as control commands; a system bus 36 for transferring a variety of data and signals; a keyboard 37 to be operated by an operator; a keyboard controller 38 for detecting key signals supplied from the keyboard 37; a display 39 for displaying an operation state of the color printer 20 and the like; a display controller 40 for controlling the display 39; and a dual port RAM 41 for temporarily storing various data transferred from the controller CT1 to the controller CT2. The CPU 31 is connected to the aforementioned circuit components 32, 33, 33, 34, 35, 38, 40 and 41 through the system bus 36. The display controller 40 is connected to the display 39. The keyboard controller 38 is connected to the keyboard 37. The keyboard 37 is used to input instructions for setting a normal mode and a test mode, numerical data, and the like. The RAM 33 has memory areas for storing dot image data of the four color components, that is yellow, magenta, cyan and black.

The print controller CT2 includes a CPU 42 for processing dot image data and print control data temporarily stored in the dual port RAM 41; a ROM 43 for storing the control program of the CPU 42, the initial printing position data, and other fixed data; a RAM 44 for temporarily storing data input to and output from the CPU 42; a print buffer 45 for temporarily storing dot data of four color components which are supplied for a predetermined number of lines via the dual port RAM 41; a system bus 46 for transferring a variety of data and signals; a head unit 22 composed of the thermal printing heads 22Y, 22M, 22C and 22B; a head control section 47 for driving the head unit 22; a feed motor unit 48 for generating drive force supplied to the platen rollers 24Y, 24M, 24C and 24B and the pair of feed rollers 27; a ribbon motor unit 49 for generating drive force supplied to the ribbon magazines 30Y, 30M, 30C and 30B; a motor control section 50 for controlling the feed motor unit 48 and the ribbon motor unit 49; a nonvolatile RAM 51 for continuously storing correction data set in the test mode; a timer counter 52 which stores first, second, third and fourth numbers of paper feeding steps determined according to the distances from the position sensor 29 to the printing heads 22B, 22C, 22M and 22Y and counts the step numbers; and a sensor group SN composed of the paper empty sensor 28, the position sensor 29 and other sensors. The CPU 42 is connected to the circuit components 43, 44, 45, 47, 50, 51 and 52 via the system bus 46. The head unit 22 is connected to the head control section 47. The feed motor unit 48 and the ribbon motor unit 49 are connected to the motor control section 50. The CPU 42 has interruption terminals respectively connected to the sensor group SN and the timer counter 52. The feed motor unit 48 is composed of a pulse motor for the platen rollers 24Y, 24M, 24C and 24B and another pulse motor for the feed rollers 27. The rotational speeds of the pulse motors are adjustable. The timer counter 52 counts the number of driving pulses produced for the pulse motors of the feed motor unit 48 as the paper feeding step number.

Figure 6:
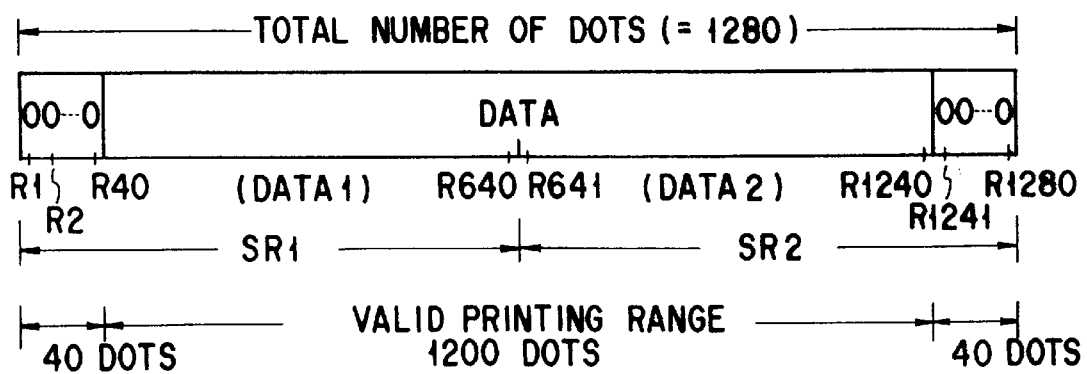
FIG. 6 is a diagram showing a line buffer constituted by two shift registers in each thermal printing head shown in FIG. 5.
Figure 5:
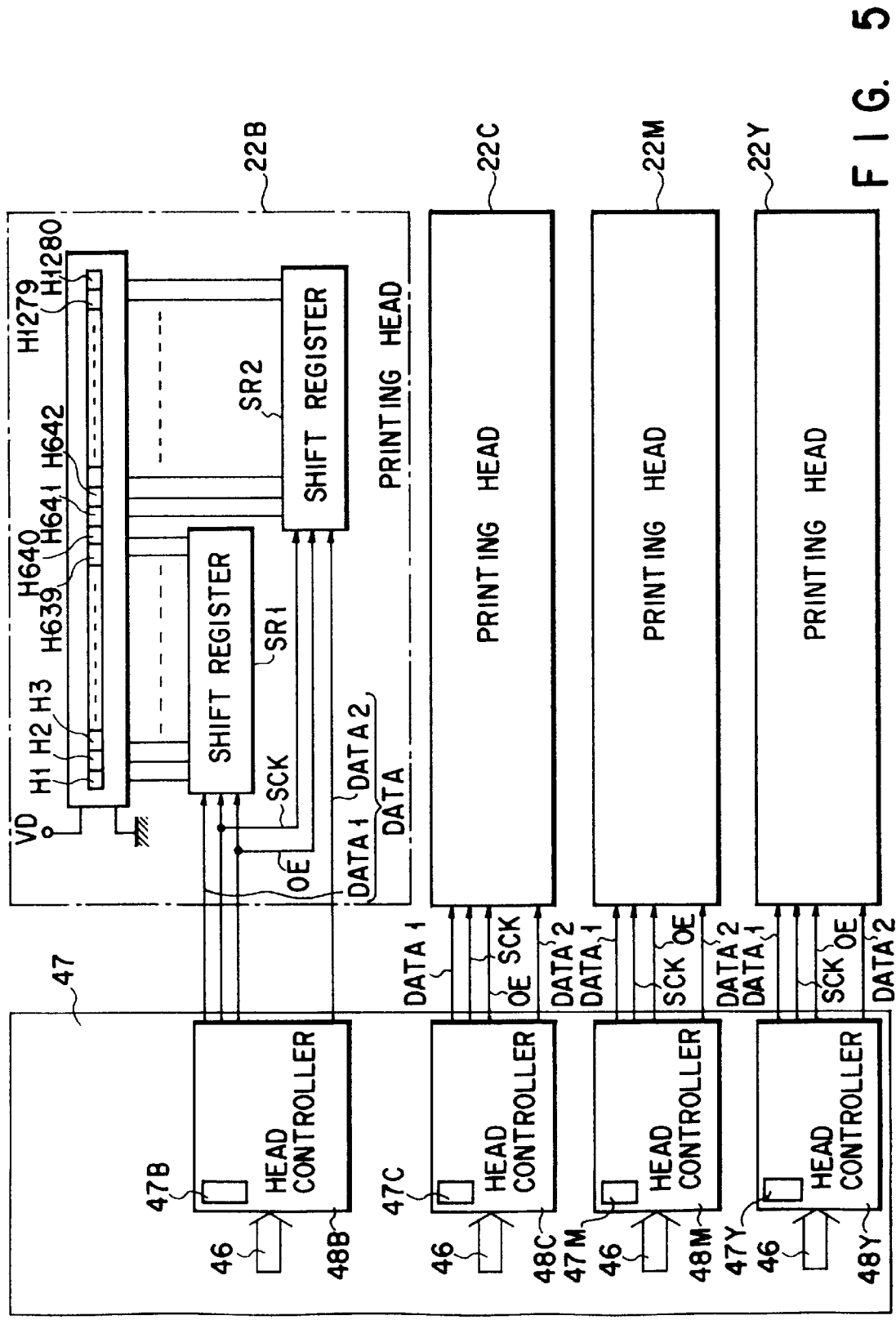
FIG. 5 is a block diagram showing the relationship between a head control section and a head unit shown in FIG. 4, in detail.

FIG. 5 shows the relationship between the head control section 47 and the head unit 22 in detail. Each of the thermal printing heads 22Y, 22M, 22C and 22B has, for example, 1,280 heat generating elements H1 to H1280 as the heat generating elements of dots described above, and two 640-bit shift registers SR1 and SR2 forming a 1280-dot line buffer, as shown in FIG. 6. The first to 640th bits of the shift register SR1 are respectively connected to the heat generating elements H1 to H640, while the first to 640th bits of the shift register SR2 are respectively connected to the heat generating elements H641 to H1280. The head control section 47 has four head controllers 48Y, 48M, 48C and 48B connected to the thermal printing heads 22Y, 22M, 22C and 22B, respectively. Each of the head controllers 48Y, 48M, 48C and 48B is capable of directly accessing the print buffer 45 to read dot data of a corresponding color component for one line. Dot data DATA for one line is composed of, for example, 1,200 bits, which are smaller than the number of the heat generating elements H1 to H1280, so that the printing position can be changed in the main-scanning direction X parallel to the dot print line of the printing head. Each of the head controllers 48Y, 48M, 48C and 48B normally performs a control of setting dot data DATA for one line in the 41st to 1240th bits of the line buffer, which is the central portion thereof, and dot data "0" indicating blank dot (no printing) in the first to 40th bits and the 1241st to 1280th bits of the line buffer. In this control, dot data DATA for one line is divided into dot data DATA1 and DATA2 to which required items of dot data "0" are added, and which are serially supplied to the shift registers SR1 and SR2 of a corresponding printing head, together with the shift clocks SCK. The head controllers 48Y, 48M, 48C and 48B respectively have counters 47Y, 47M, 47C and 47B each for counting the number of shift clocks SCK supplied to the line buffer of a corresponding one of the thermal printing heads 22Y, 22M, 22C and 22B, and producing an output enable signal OE after the count has reached a shift clock number which is preset therein and determined according to the location of an area which stores the dot data DATA for one line within the line buffer. The shift registers SR1 and SR2 store the dot data DATA1 and DATA2 and the items of dot data "0" added thereto by sequentially shifting them in response to the shift clock SCK, and output them in parallel upon supply of the output enable signal OE. The heat generating elements H1 to H1280 are selectively driven in accordance with the contents of the first to the 1280th bits of the line buffer composed of the shift registers SR1 and SR2. The operation voltage for the heat generating elements H1 to H1280 is supplied from the voltage from a drive voltage terminal VD.

The operation of the color printer 20 to be performed in the normal mode will be described below.

The CPU 31 and 42 perform an initializing process upon supply of power. In the initializing process, for example, the counters 47Y, 47M, 47C and 47B and the timer counter 52 are initialized by the initial print control data stored in the ROM 43. In a case where correction data are present in the nonvolatile RAM 41, the initial print control data are replaced with print control data which are produced on the basis of these correction data.

When the printing data, the print size data and the print format data are supplied from the host computer HC to the color printer 20 as the control commands, these control commands are sequentially stored in the RAM 33 through the communication interface 35. In accordance with the control commands stored in the RAM 33, the CPU 31 performs a process of producing print control data and dot image data of the four color components in RAM 33, the print control data corresponding to the print size data and print format data, and the dot image data corresponding to the printing data. In accordance with the print control data produced in RAM 33 and supplied to the dual port RAM 41, the CPU 42 determines the print size, the print format and the like, and then instructs the motor control section 50 to feed paper and transfer the dot image data of the four color components from the dual port RAM 41 to the print buffer 45 in units of a predetermined number of lines.

The CPU 42 enables the operations of the timer counter 52 and the head controller 48B in response to an interruption signal from the position sensor 29. The head controller 48B reads black dot data for one line from the print buffer 45, divides the read dot data DATA into dot data DATA1 and DATA2, adds required items of dot data "0" to each of the dot data DATA1 and DATA2, and supplies them to the thermal printing head 22B together with shift clocks SCK, the number of which is determined by that stored in the counter 47B. Thus, the dot data DATA1 and DATA2 are, together with required items of dot data "0", stored in the shift registers SR1 and SR2. Thereafter, the timer counter 52 produces an interruption signal at the time when an available area of the paper reaches the printing head 22B. At this time, the CPU 42 permits printing of a black image. Thus, the head controller 48B sends an output enable signal OE to the printing head 22B. As a result, the printing head 22B is driven in accordance with the contents of the shift registers SR1 and SR2, thereby printing an image for one line. To continuously drive the printing head 22B, the head controller 48B repeats an operation of reading dot data for a next one line from the print buffer 45, storing the read dot data together with the required items of dot data "0" in the shift registers SR1 and SR2, and sending an output enable signal OE at the time when the paper has been fed for one line.

The CPU 42 enables the operation of the head controller 48C in response to the interruption signal which is produced from the timer counter 52 at the time when the available area of the paper reaches the printing head 22B. The head controller 48C reads cyan dot data for one line from the print buffer 45, divides the read dot data DATA into dot data DATA1 and DATA2, adds required items of dot data "0" to each of the dot data DATA1 and DATA2, and supplies them to the thermal printing head 22C together with shift clocks SCK, the number of which is determined by that stored in the counter 47C. Thus, the dot data DATA1 and DATA2 are, together with required items of dot data "0", stored in the shift registers SR1 and SR2. Thereafter, the timer counter 52 produces an interruption signal at the time when an available area of the paper reaches the printing head 22C. At this time, the CPU 42 permits printing of a cyan image. Thus, the head controller 48C sends an output enable signal OE to the printing head 22C. As a result, the printing head 22C is driven in accordance with the contents of the shift registers SR1 and SR2, thereby printing an image for one line. To continuously drive the printing head 22C, the head controller 48C repeats an operation of reading dot data for a next one line from the print buffer 45, storing the read dot data together with the required items of dot data "0" in the shift registers SR1 and SR2, and sending an output enable signal OE at the time when the paper has been fed for one line.

The CPU 42 enables the operation of the head controller 48M in response to the interruption signal which is produced from the timer counter 52 at the time when the available area of the paper reaches the printing head 22C. The head controller 48M reads magenta dot data for one line from the print buffer 45, divides the read dot data DATA into dot data DATA1 and DATA2, adds required items of dot data "0" to each of the dot data DATA1 and DATA2, and supplies them to the thermal printing head 22M together with shift clocks SCK, the number of which is determined by that stored in the counter 47M. Thus, the dot data DATA1 and DATA2 are, together with required items of dot data "0", stored in the shift registers SR1 and SR2. Thereafter, the timer counter 52 produces an interruption signal at the time when an available area of the paper reaches the printing head 22M. At this time, the CPU 42 permits printing of a magenta image. Thus, the head controller 48M sends an output enable signal OE to the printing head 22M. As a result, the printing head 22M is driven in accordance with the contents of the shift registers SR1 and SR2, thereby printing an image for one line. To continuously drive the printing head 22M, the head controller 48M repeats an operation of reading dot data for a next one line from the print buffer 45, storing the read dot data together with the required items of dot data "0" in the shift registers SR1 and SR2, and sending an output enable signal OE at the time when the paper has been fed for one line.

The CPU 42 enables the operation of the head controller 48Y in response to the interruption signal which is produced from the timer counter 52 at the time when the available area of the paper reaches the printing head 22M. The head controller 48Y reads yellow dot data for one line from the print buffer 45, divides the read dot data DATA into dot data DATA1 and DATA2, adds required items of dot data "0" to each of the dot data DATA1 and DATA2, and supplies them to the thermal printing head 22Y together with shift clocks SCK, the number of which is determined by that stored in the counter 47Y. Thus, the dot data DATA1 and DATA2 are, together with required items of dot data "0", stored in the shift registers SR1 and SR2. Thereafter, the timer counter 52 generates an interruption signal at the time when an available area of the paper reaches the printing head 22Y. At this time, the CPU 42 permits printing of an Yellow image. Thus, the head controller 48Y sends an output enable signal OE to the printing head 22Y. As a result, the printing head 22Y is driven in accordance with the contents of the shift registers SR1 and SR2, thereby printing an image for one line. To continuously drive the printing head 22Y, the head controller 48Y repeats an operation of reading dot data for a next one line from the print buffer 45, storing the read dot data together with the required items of dot data "0" in the shift registers SR1 and SR2, and sending an output enable signal OE at the time when the paper has been fed for one line.

As described above, the printing units 21B, 21C, 21M and 21Y prints black, cyan, magenta and yellow color component images which are overlaid on the same available area of the paper.

The color printer 20 according to this embodiment is operable in the test mode as well as in the normal mode. The test mode is provided to print a deviation test pattern by means of the printing units 21B, 21C, 21M and 21Y so that an operator can measure printing position errors of the printing units 21C, 21M and 21Y with respect to the printing unit 21B in the deviation test pattern, and to change the printing positions of the printing units 21B, 21C, 21M and 21Y in accordance with a result of measurement input from the keyboard 37. The ROM 32 of the system controller CT1 previously stores first and second test printing data for use in the test mode. The first test printing data is data for printing a deviation test pattern for the main-scanning direction X, whereas the second test printing data is data for printing a deviation test pattern for the sub-scanning direction P.

Figure 7:
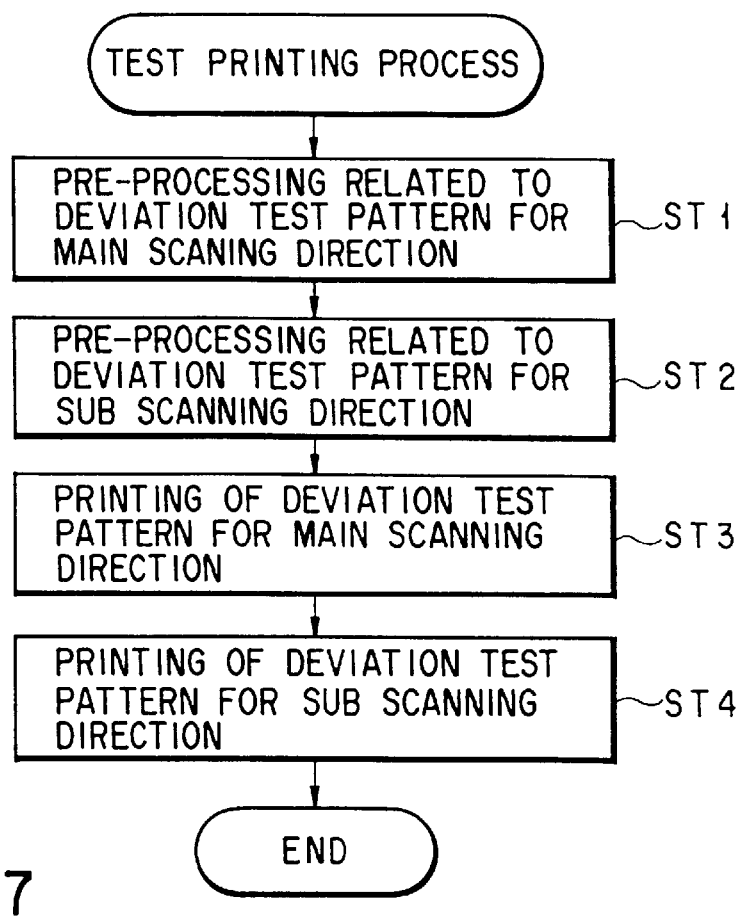
FIG. 7 is a flowchart of a test printing process performed by the control circuit shown in FIG. 4.

When an instruction for setting the test mode is input from the keyboard 37, the control circuit of the color printer 20 performs a test printing process shown in FIG. 7. In the test printing process, the CPU 31 performs in step ST1 a pre-processing related to the deviation test pattern for the main-scanning direction X. In this pre-processing, the CPU 31 reads the first test printing data stored in the ROM 32, and produces, in the RAM 33, dot image data of the four color components corresponding to the first test printing data and print control data designating a predetermined print size and a predetermined print format.

Moreover, the CPU 31 performs in step ST2 a pre-processing related to the deviation test pattern for the sub-scanning direction P. In this pre-processing, the CPU 31 reads the second test printing data stored in the ROM 32, and produces, in the RAM 33, dot image data of the four color components corresponding to the second test printing data and print control data designating a predetermined print size and a predetermined print format.

In step ST3, the CPU 42 performs a pattern printing process of reading, from the RAM 33 via the dual port RAM 41, dot image data of the four color components which are assigned to the deviation test pattern for the main-scanning direction X, and controlling the printing units 21Y, 21M, 21C and 21B as in the same manner as the normal mode to print four color component images corresponding to the dot image data which are overlaid to obtain the deviation test pattern for the main-scanning direction X.

In step ST4, the CPU 42 performs a pattern printing process of reading, from the RAM 33 via the dual port RAM 41, dot image data of the four color components which are assigned to the deviation test pattern for the sub-scanning direction P, and controlling the printing units 21Y, 21M, 21C and 21B as in the same manner as the normal mode to print four color component images corresponding to the dot image data which are overlaid to obtain the deviation test pattern for the sub-scanning direction P.

Figure 8:
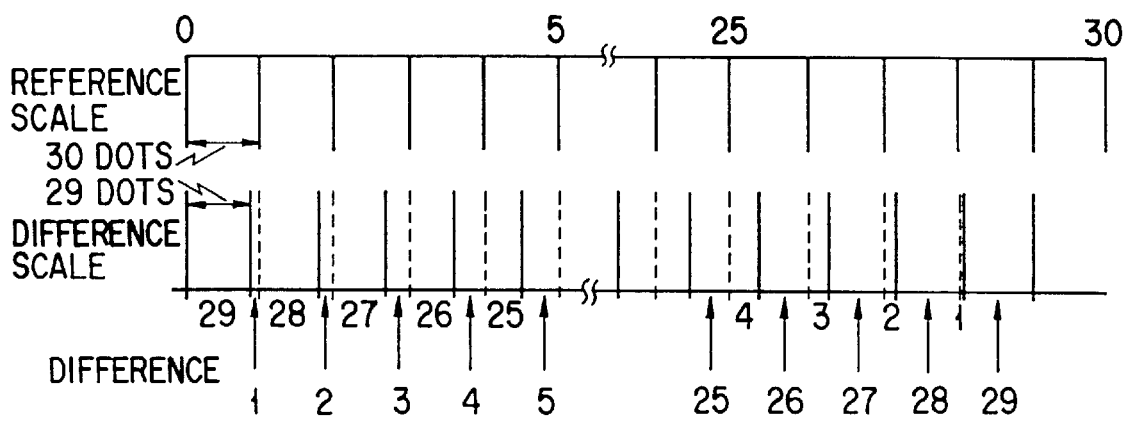
FIG. 8 is a diagram for explaining the outstanding features of a deviation test pattern which should be printed in the test printing process shown in FIG. 7.

The outstanding features of the deviation test patterns which should be printed in the test printing process will be described briefly. As shown in FIG. 8, each deviation test pattern is formed of a reference scale and difference scales. The reference scale has a plurality of reference-scale bars RB arranged at a pitch M in a deviation-measuring direction which corresponds to the main-scanning direction X or the sub-scanning direction P. Each difference scale has difference-scale bars DB arranged at a pitch N slightly different from the pitch M, in the deviation-measuring direction. The reference scale is printed by the printing unit 21B, which is one reference printing unit among the printing units 21B, 21C, 21M and 21Y arranged to print overlaid images. The difference scale are printed by the printing units 21C, 21M and 21Y other than the reference printing unit 21B. The pitch M is set to, for example, 30 dots, while the pitch N is set to, for example, 29 dots which is slightly smaller than the pitch M. If there is no deviation or error in the printing positions of these scales, printing is performed in such a manner that the 0th difference-scale bar DB aligns with the 0th reference-scale bar RB, and the 30th difference-scale bar DB aligns with the 29th reference-scale bar RB, as shown in FIG. 8. If there is a deviation or error in the printing positions, the deviation can be measured with an accuracy of one dot, which is the same as the difference between the number of the dots of the pitch M and that of the dot N.

Figure 9:
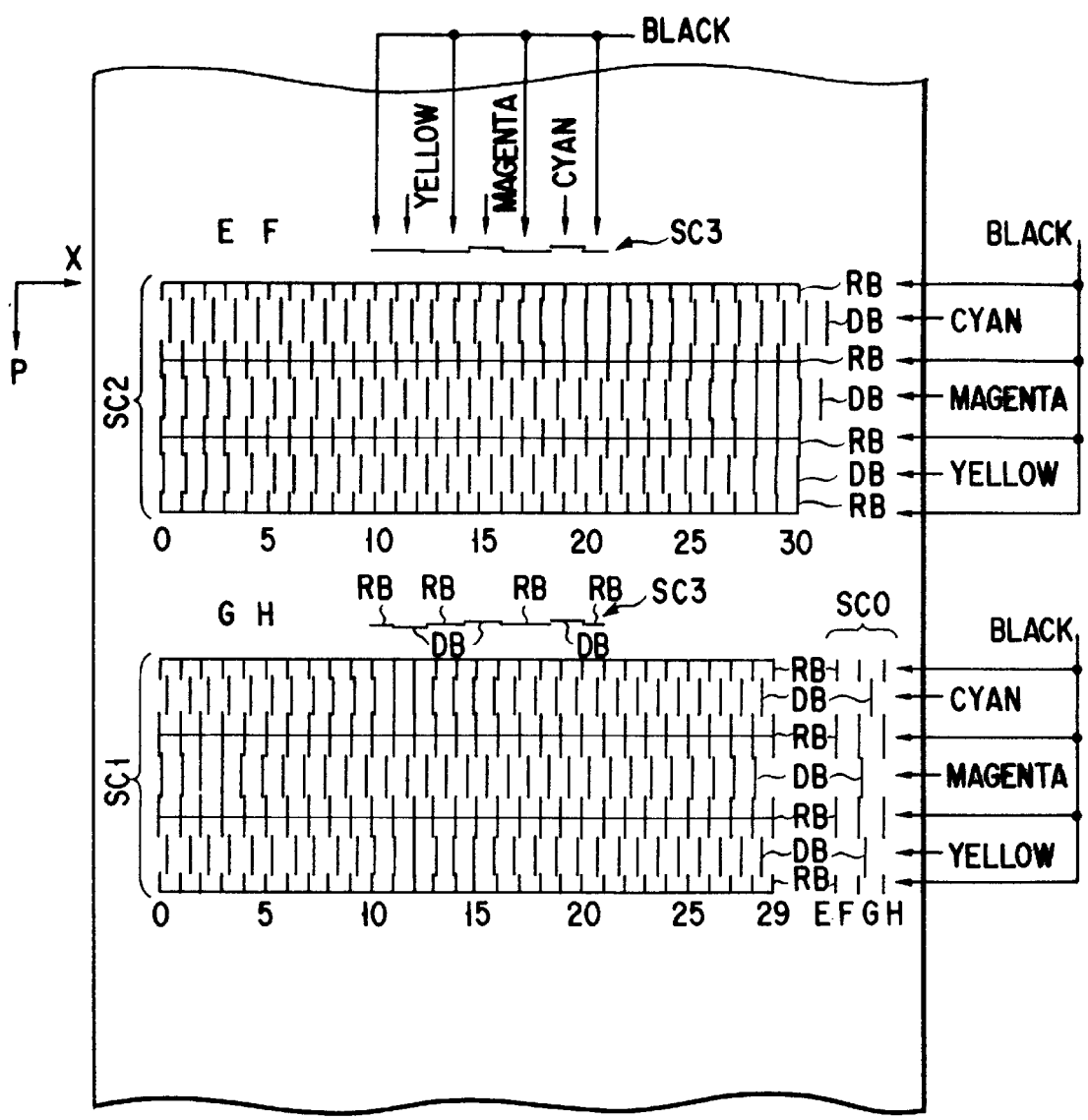
FIG. 9 is a view showing a deviation test pattern actually printed in the test printing process shown in FIG. 7 in order to measure positional errors in the main-scanning direction.
Figure 10:
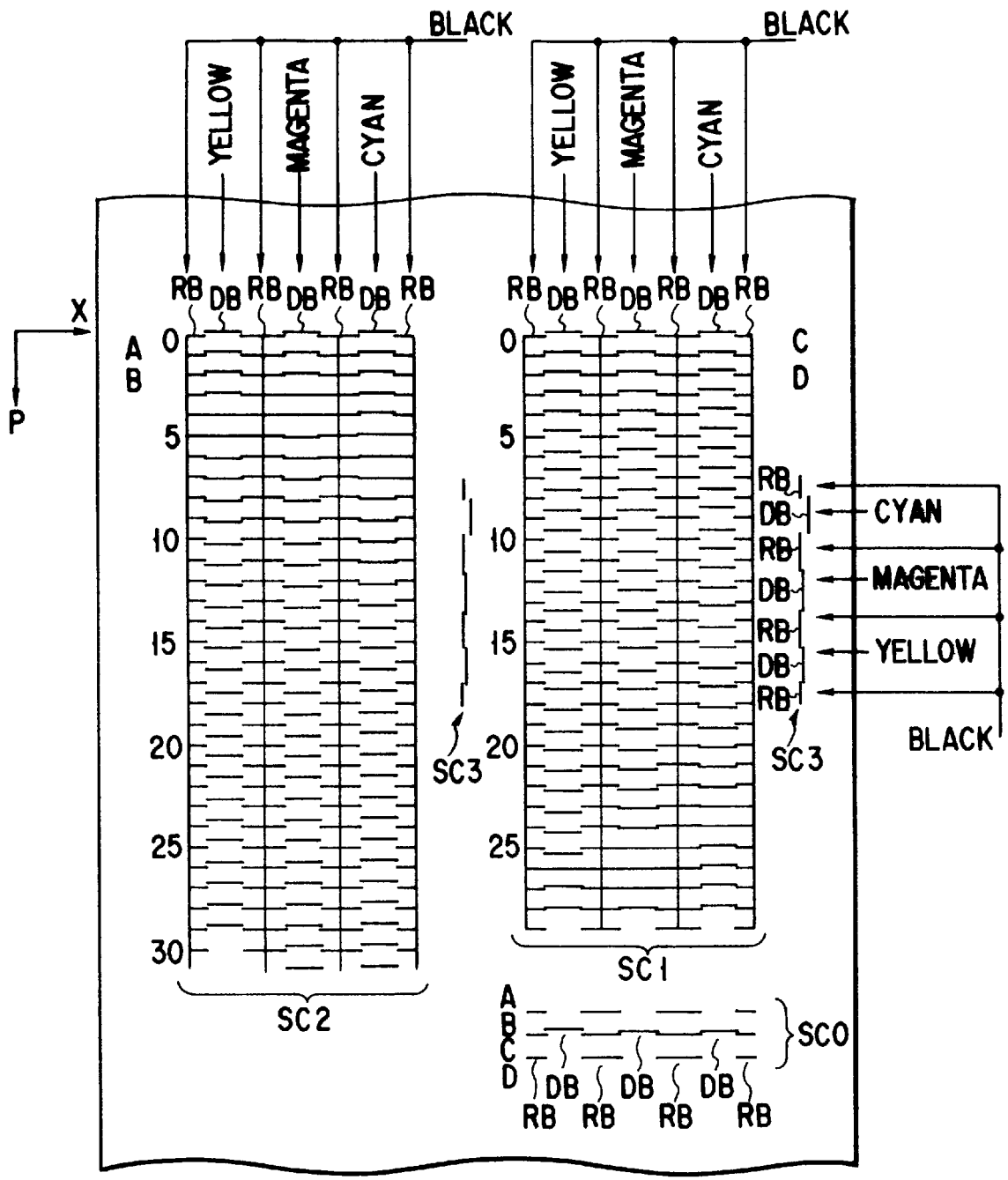
FIG. 10 is a view showing a deviation test pattern actually printed in the test printing process shown in FIG. 7 in order to measure positional errors in the sub-scanning direction.

The color printer 20 according to this embodiment is designed to print the deviation test pattern for the main-scanning direction X shown in FIG. 9 and the deviation test pattern for the sub-scanning direction P shown in FIG. 10 in accordance with the first and second test printing data stored in the ROM 32.

A deviation test pattern shown in FIG. 9 has a schematic scale section SC0, two detailed scale sections SC1 and SC2 and two sub-scale sections SC3. The schematic scale section SC0 is formed adjacent to the detailed scale section SC1 in the main-scanning direction X, and the detailed scale section SC1 is formed adjacent to the detailed scale section SC2 in the sub-scanning direction P. The two sub-scale sections SC3 are formed adjacent to the detailed scale sections SC1 and SC2 in the sub-scanning direction P.

The schematic scale section SC0 has four black reference scales arranged in parallel in the sub-scanning direction P and spaced from each other by a predetermined distance; cyan, magenta and yellow difference-scale bars each positioned between two of the reference scales; and region area symbols "E", "F", "G" and "H" arranged along an outermost black reference scale. Each of the four black reference scales has a negative reference-scale bar RB, a zero reference-scale bar RB and a positive reference-scale bar RB arranged rightward in the main-scanning direction X at a pitch of 30 dots. The region symbols "E", "F", "G" and "H" indicate regions divided by the negative reference-scale bar RB, the zero reference-scale bar RB and the positive reference-scale bar RB in the main-scanning direction X. If the printing positions are not deviated, the cyan, magenta and yellow difference-scale bars DB align with the zero reference-scale bars RB of the four black reference scales. The region "E" indicates a positional error of −31 to −60 dots, the region "F" indicates a positional error of −1 to −30 dots, the region "G"

indicates a positional error of +1 to +30 dots, and the region "H" indicates a positional error of +31 to +60 dots. The foregoing predetermined distance substantially coincides with the length of the difference-scale bar DB.

The detailed scale section SC1 has four black reference scales arranged in parallel in the sub-scanning direction P and spaced from each other by a predetermined distance; cyan, magenta and yellow difference scales each positioned between two of the reference scales; identification symbol "GH" positioned adjacent to an outermost black reference scale; and bar numbers "0", "5", "10", . . . , positioned adjacent to another outermost black reference scale. Each of the four black reference scales has a plurality of reference-scale bars RB arranged rightward in the main-scanning direction X at a pitch of 30 dots. Each of the cyan, magenta and yellow difference scales has a plurality of difference-scale bars DB arranged from rightward in the main-scanning direction X at a pitch of 29 dots. The reference-scale bars RB of each black reference scale are connected to each other by a straight line extending in the main-scanning direction X. If the printing positions are not deviated, the 0th difference-scale bars DB of the cyan, magenta and yellow difference scales align with the 0th reference-scale bars RB of the four black reference scales. Also, the 30th difference-scale bars DB align with the 29th reference-scale bars RB. The identification symbol "GH" indicates a detailed scale corresponding to the regions indicated by the region symbols "G" and "H" in the schematic scale section SC0. The bar numbers "0", "5", "10", . . . , indicate the numbers assigned to the reference-scale bars RB of each black reference scale. The predetermined distance substantially coincides with the length of the reference-scale bar RB.

The detailed scale section SC2 has four black reference scales arranged in parallel in the sub-scanning direction P and spaced from each other by a predetermined distance; cyan, magenta and yellow difference scales each positioned between two of the reference scales; identification symbol "EF" positioned adjacent to an outermost black reference scale; and bar numbers "0", "5", "10", . . . , positioned adjacent to another outermost black reference scale. Each of the four black reference scales has a plurality of reference-scale bars RB arranged rightward in the main-scanning direction X at a pitch of 30 dots. Each of the cyan, magenta and yellow difference scales has a plurality of difference-scale bars DB arranged rightward in the main-scanning direction X at a pitch of 31 dots. The reference-scale bars RB of each black reference scale are connected to each other by a straight line extending in the main-scanning direction X. If the printing positions are not deviated, the 0th difference-scale bars DB of the cyan, magenta and yellow difference scales align with the 0th reference-scale bars RB of the four black reference scales. Also, the 30th difference-scale bars DB align with the 31st reference-scale bars RB. The identification symbol "EF" indicates a detailed scale corresponding to the regions indicated by the region symbols "E" and "F" in the schematic scale section SC0. The bar numbers "0", "5", "10", . . . , indicate the numbers assigned to the reference-scale bars RB of each black reference scale. The predetermined distance substantially coincides with the length of the reference-scale bar DB.

The sub-scale section SC3 is formed to confirm that no positional error exists in the sub-scanning direction P. The sub-scale section SC3 has four black reference-scale bars RB extending in the main-scanning direction X, and cyan, magenta and yellow difference-scale bars DB extending in the main-scanning direction X and each positioned between two of the reference-scale bars RB. If no positional error exists in the sub-scanning direction P, the difference-scale bars DB align with the reference-scale bars RB.

A deviation test pattern shown in FIG. 10 has a schematic scale section SC0, two detailed scale sections SC1 and SC2 and two sub-scale sections SC3. The schematic scale section SC0 is formed adjacent to the detailed scale section SC1 in the sub-scanning direction P, and the detailed scale section SC1 is formed adjacent to the detailed scale section SC2 in the main-scanning direction X. The two sub-scale sections SC3 are formed adjacent to the detailed scale sections SC1 and SC2 in the main-scanning direction X.

The schematic scale section SC0 has four black reference scales arranged in parallel in the main-scanning direction X and spaced from each other by a predetermined distance; cyan, magenta and yellow difference-scale bars DB each positioned between two of the reference scales; and region symbols "A", "B", "C" and "D" arranged along the outermost black reference scale. Each of the four black reference scales has a negative reference-scale bar RB, the zero reference-scale bar RB and the positive reference-scale bar RB arranged downward in the sub-scanning direction P at a pitch of 30 dots. The region symbols "A", "B", "C" and "C" indicate regions divided by the negative reference-scale bar RB, the zero reference-scale bar RB and the positive reference-scale bar RB in the sub-scanning direction P. If the printing positions are not deviated, the cyan, magenta and yellow difference-scale bars DB align with the zero reference-scale bars RB of the four black reference scales. The region "A" indicates a positional error of −31 to −60 dots, the region "B" indicates a positional error of −1 to −30 dots, the region "C" indicates a positional error of +1 to +30 dots, and the region "D" indicates a positional error of +31 dot to +60 dots. The foregoing pre-determined distance substantially coincides with the length of the difference-scale bar DB.

The detailed scale section SC1 has four black reference scales arranged in parallel in the main-scanning direction X and spaced from each other by a predetermined distance; cyan, magenta and yellow difference scales each positioned between two of the reference scales; identification symbol "CD" positioned adjacent to an outermost black reference scale; and bar numbers "0", "5", "10", . . . , positioned adjacent to another outermost black reference scale. Each of the four black reference scales has a plurality of reference-scale bars RB arranged downward in the sub-scanning direction P at a pitch of 30 dots. Each of the cyan, magenta and yellow difference scales has a plurality of difference-scale bars DB arranged downward in the sub-scanning direction P at a pitch of 29 dots. The reference-scale bars RB of each black reference scale are connected to each other by a straight line extending in the sub-scanning direction P. If the printing positions are not deviated, the 0th difference-scale bars DB of the cyan, magenta and yellow difference scales align with the 0th reference-scale bars RB of the four black reference scale. Also, the 30th difference-scale bars DB align with the 29th reference-scale bars RB. The identification symbol "CD" indicates a detailed scale corresponding to the regions indicated by the region symbols "C" and "D" in the schematic scale section SC0. The bar numbers "0", "5", "10", . . . , indicate the numbers assigned to the reference-scale bars RB of each black reference scale. The predetermined distance substantially coincides with the length of the reference-scale bar DB.

The detailed scale section SC2 has four black reference scales arranged in parallel in the main-scanning direction X and spaced from each other by a predetermined distance; cyan, magenta and yellow difference scales each positioned between two of the reference scales; identification symbol "AB" positioned adjacent to an outermost black reference scale; and bar numbers "0", "5", "10", . . . , positioned adjacent to another outermost black reference scale. Each of the four black reference scales has a plurality of reference-scale bars RB arranged downward in the sub-scanning direction P at a pitch of 30 dots. Each of the cyan, magenta and yellow difference scales has a plurality of difference-scale bars DB arranged downward in the sub-scanning direction P at a pitch of 31 dots. The reference-scale bars RB of each black reference scale are connected to each other by a straight line extending in the sub-scanning direction P. If the printing positions are not deviated, the 0th difference-scale bars DB of the cyan, magenta and yellow difference scales align with the 0th reference-scale bars RB of the four black reference scales. Also, the 30th difference-scale bars DB align with the 31st reference-scale bars RB. The identification symbol "AB" indicates a detailed scale corresponding to the regions indicated by the region symbols "A" and "B" in the schematic scale section SC0. The bar numbers "0", "5", "10", . . . , indicate the numbers assigned to the reference-scale bars RB of each black reference scale. The predetermined distance substantially coincides with the length of the reference-scale bar DB.

The sub-scale section SC3 is formed to confirm that no positional error exists in the main-scanning direction X. The sub-scale section SC3 has four black reference-scale bars RB extending in the sub-scanning direction P and cyan, magenta and yellow difference-scale bars DB extending in the sub-scanning direction P and each positioned between two of the reference-scale bars RB. If no positional error exists in the main-scanning direction X, the difference-scale bars DB align with the reference-scale bars RB.

With the color printer described above, an operator observes the deviation test patterns shown in FIGS. 9 and 10, and measures deviations or errors in the printing positions of the printing units 21C, 21M, and 21Y with respect to the printing position of the printing unit 21B.

In measurement of the positional errors in the main-scanning direction X, the operator initially checks the schematic scale section SC0 of the deviation test pattern shown in FIG. 9, and schematically confirms the positional relationship between the zero reference-scale bars RB and the the cyan, magenta, and yellow difference-scale bars DB. For example, when the cyan difference-scale bar DB is present in the "G" region located between the zero reference-scale bar RB and the positive reference-scale bar RB in the schematic scale section SC0, the positional error of the printing unit 21C do not exceed +30 dots in the main-scanning direction X. After confirming the cyan difference-scale bar DB present in the "G" region, the operator checks the detailed scale section SC1 corresponding to the "G" region to detect a reference-scale bar RB which aligns with one of the cyan difference-scale bars DB in the detailed scale section SC1. If the 11th reference-scale bar RB aligns with one of the cyan difference-scale bars DB, the positional error of the printing unit 21C is detected to be +11 dots in the main-scanning direction. As a result of measurement, the operator sets correction data "G11" to correct the positional error of the printing unit 21C in the main-scanning direction X. If the cyan difference-scale bar DB is present in the "H" region exceeding the positive reference-scale bar RB, the positional error of the printing unit 21C is detected to be +41 dots. Therefore, the operator the operator sets correction data "H11" to correct the positional error of the printing unit 21C in the main-scanning direction X.

In a case where the cyan difference-scale bar DB is present in the "F" region located between the zero reference-scale bar RB and the negative reference-scale bar RB, the detailed scale section SC2 corresponding to the "F" region is checked. As for the positional errors of the magenta printing units 21M and the yellow printing unit 21Y, they are measures from the deviation test pattern shown in FIG. 9 in the same manner as measurement of the positional error of the cyan printing unit 21C.

In measurement of the positional errors in the sub-scanning direction P, the operator initially checks the schematic scale section SC0 of the deviation test pattern shown in FIG. 10, and schematically confirms the positional relationship between the zero reference-scale bars RB and the the cyan, magenta, and yellow difference-scale bars DB. For example, when the cyan difference-scale bar DB is present in the "B" region located between the zero reference-scale bar RB and the negative reference-scale bar RB in the schematic scale section SC0, the positional error of the printing unit 21C do not exceed −30 dots in the sub-scanning direction X. After confirming the cyan difference-scale bar DB present in the "B" region, the operator checks the detailed scale section SC2 corresponding to the "B" region to detect a reference-scale bar RB which aligns with one of the cyan difference-scale bars DB in the detailed scale section SC2. If the 6th reference-scale bar RB aligns with one of the cyan difference-scale bars DB, the positional error of the printing unit 21C is detected to be −6 dots in the sub-scanning direction P. As a result of measurement, the operator sets correction data "B6" to correct the positional error of the printing unit 21C in the sub-scanning direction P. If the cyan difference-scale bar DB is present in the "A" region exceeding the negative reference-scale bar RB, the positional error of the printing unit 21C is detected to be −36 dots [(−30)+(−6)dots]. Therefore, the operator the operator sets correction data "A6" to correct the positional error of the printing unit 21C in the sub-scanning direction P.

In a case where the cyan difference-scale bar DB is present in the "C" region located between the zero reference-scale bar RB and the positive reference-scale bar RB, the detailed scale section SC1 corresponding to the "C" region is checked. As for the positional errors of the magenta printing. units 21M and the yellow printing unit 21Y, they are measures from the deviation test pattern shown in FIG. 10 in the same manner as the measurement of the positional error of the cyan printing unit 21C.

Figure 11:
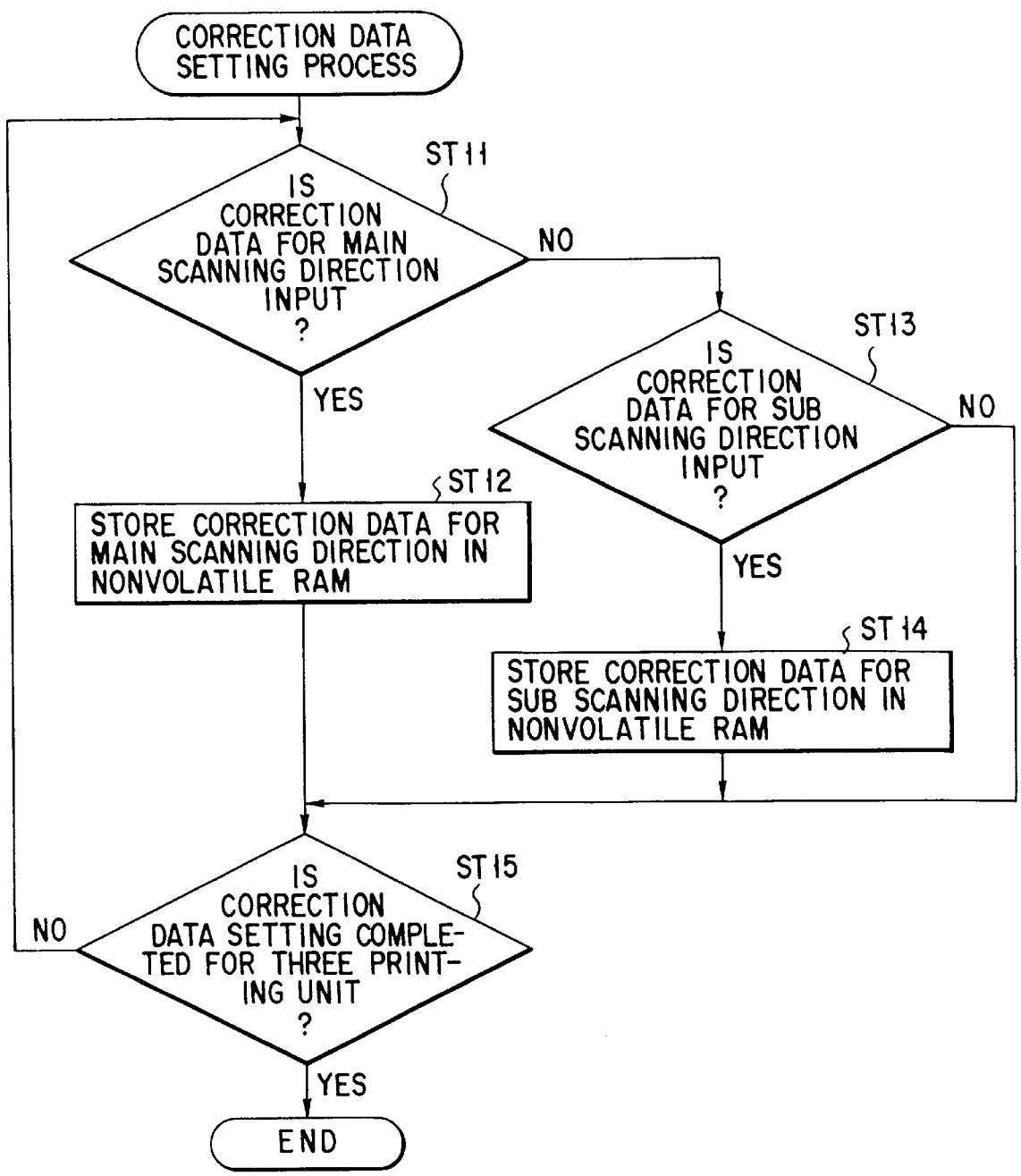
FIG. 11 is a flowchart of a correction data setting process performed by the control circuit shown in FIG. 4.

FIG. 11 shows a correction data setting process performed by the control circuit of the color printer 20. This correction data setting process is performed after printing the deviation test patterns for the main-scanning direction X and sub-scanning direction P as shown in FIGS. 9 and 10. The operator input the items of correction data corresponding to results of measurement for the positional errors of the printing units 21Y, 21M and 21C, by means of the keyboard 37 or the host computer HC. The correction data for the main-scanning direction is checked in step ST11 and stored in the nonvolatile RAM 51 in step ST12. On the other hand, the correction data for the sub-scanning direction is checked in step ST 13, and stored in the nonvolatile RAM 51 in step ST14. In step ST15, it is checked whether setting of correction data is completed with respect to the printing units 21Y, 21M and 21C. The correction data setting process terminates after repeatedly executing the above-described steps.

Figure 12:
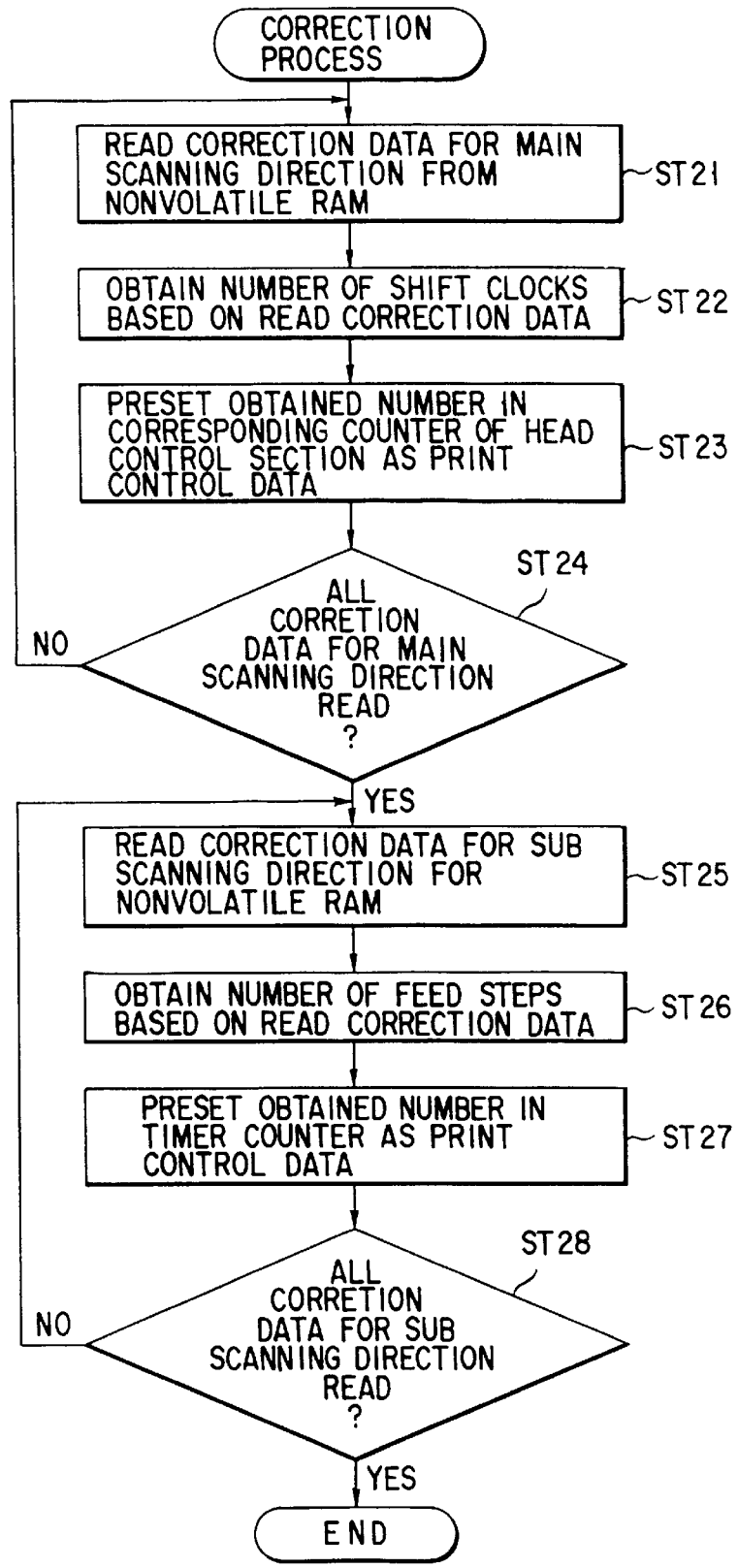
FIG. 12 is a flowchart of a correction process performed by the control circuit shown in FIG. 4.

FIG. 12 shows a correction process performed by the control circuit of the color printer 20. This correction process is performed upon supply of power or after the correction data setting process shown in FIG. 11. When correction data for the main-scanning direction X is read from the nonvolatile RAM 51 in step ST21, the number of shift clocks SCK is obtained on the basis of the read correction data in step ST22, and, in step ST23, preset in a corresponding counter of the head control section 47 as print control data for a corresponding printing unit. The correction data is, for example, of "G11", the print control data is set to be the number of shift clocks which causes the printing position of the corresponding printing unit to be shifted by −11 dots in the main-scanning direction X. In step ST24, it is checked whether all of the correction data for the main-scanning direction X are read. If unread correction data for the main-scanning direction X remains, step ST21 is executed again.

After all of the correction data for the main-scanning direction X have been read in step ST24, correction data for the sub-scanning direction P is read from the nonvolatile RAM 51 in step ST25. Thereafter, the number of paper feeding steps is obtained on the basis of the read correction data, and stored, in step ST27, preset in the timer counter 52 as print control data for a corresponding printing unit. The correction data is, for example, of "B6", the print control data is set to be the number of paper feeding steps which causes the printing position of the corresponding printing unit to be shifted by +6 dots in the sub-scanning direction P. In step ST28, it is checked whether all of the correction data for the sub-scanning direction P are read. If unread correction data for the sub-scanning direction P remains, step ST25 is executed again.

The detailed operations of the head controllers 48Y, 48M, 48C and 48B controlling the printing heads 22Y, 22M, 22C and 22B will be described. In the head controller 48Y, 48M, 48C and 48B, the counters 47Y, 47M, 47C and 47B initially have print control data of "680" indicating the number of shift clocks. The operation of the head controller is explained below. However, since the head controllers 48Y, 48M and 48B have the same construction as the head controller 48C, repetitive explanations thereof are omitted. In the correction process shown in FIG. 12, the print control data stored in the counters 47Y, 47M and 47C are updated to correct the positional errors of the printing units 21Y, 21M and 21C in the main-scanning direction X. However, the print control data stored in the counter 47B is not updated.

FIG. 13 shows an operation of a head controller 48C which is performed when no positional error exists in the main-scanning direction X. In this operation, the head controller 48C sequentially supplies 680 shift clocks SCK determined by the print control data stored in the counter 47C to the shift registers SR1 and SR2 of the printing head 22C which form a line buffer of FIG. 6, and supplies 680 items of dot data to the shift registers SR1 and SR2 in synchronism with the shift clocks SCK. As shown in FIG. 13, the shift register SR1 sequentially receives 640-bit dot data DATA1 and subsequent 40-bit dot data "0, 0, . . . , 0", and the shift register SR2 sequentially receives 80-bit dot data "0, 0, . . . , 0" and subsequent 600-bit dot data DATA2. The dot data DATA1 correspond to dot data D640 to D1 selected from the dot data for one line which are read from the print buffer 45 to the head controller 48C. The dot data DATA2 correspond to dot data D1200 to D601 selected from the dot data for one line which are read from the print buffer 45 to the head controller 48C. The dot data D640 to D601 assigned to the shift clocks SCK (C1 to C40) are deleted due to an overflow of the shift register SR1, and the dot data "0, 0, . . . , 0" assigned to the shift clocks SCK (C1 to C40) are deleted due to an overflow of the shift register SR2. Accordingly, the dot data "0, 0, . . . , 0" are stored in the bits R1 to R40 of the line buffer, and the dot data D1 to D1200 are stored in the bits R41 to R1240 of the line buffer, the dot data "0, 0, . . . , 0" are stored in the bits R1241 to R1280 of the line buffer.

FIG. 14 shows an operation of a head controller 48C which is performed when a positional error in the main-scanning direction X is corrected by increasing the number of the shift clocks SCK. When the print control data stored in the counter 47C is updated to "680+n" (n: positive integer not greater than 40), the head controller 48C sequentially supplies (680+n) shift clocks SCK determined by the print control data stored in the counter 47C to the shift registers SR1 and SR2 of the printing head 22C, and supplies (680+n) items of dot data to the shift registers SR1 and SR2 in synchronism with the shift clocks SCK. As shown in FIG. 14, the shift register SR1 sequentially receives 640-bit dot data DATA1 and subsequent (40+n)-bit dot data "0, 0, . . . , 0", and the shift register SR2 sequentially receives 80-bit dot data "0, 0, . . . , 0" and subsequent (600−n)-bit dot data DATA2. The dot data DATA1 correspond to dot data D640 to D1 selected from the dot data for one line which are read from the print buffer 45 to the head controller 48C. The dot data DATA2 correspond to dot data D1200 to D(601−n) selected from the dot data for one line which are read from the print buffer 45 to the head controller 48C. The dot data D640 to D(601−n) assigned to the shift clocks SCK (C1 to C(40+n)) are deleted due to an overflow of the shift register SR1, and the dot data "0, 0, . . . , 0" assigned to the shift clocks SCK (C1 to C(40+n)) are deleted due to an overflow of the shift register SR2. Accordingly, the dot data "0, 0, . . . , 0" are stored in the bits R1 to R(40+n) of the line buffer, and the dot data D1 to D1200 are stored in the bits R(41+n) to R(1240+n) of the line buffer, the dot data "0, 0, . . . , 0" are stored in the bits R(1241+n) to R1280 of the line buffer.

FIG. 15 shows an operation of a head controller 48C which is performed when a positional error in the main-scanning direction X is corrected by decreasing the number of the shift clocks SCK. When the print control data stored in the counter 47C is updated to "680−m" (m: positive integer not greater than 40), the head controller 48C sequentially supplies (680−m) shift clocks SCK determined by the print control data stored in the counter 47C to the shift registers SR1 and SR2 of the printing head 22C, and supplies (680−m) items of dot data to the shift registers SR1 and SR2 in synchronism with the shift clocks SCK. As shown in FIG. 15, the shift register SR1 sequentially receives 640-bit dot data DATA1 and subsequent (40−m)-bit dot data "0, 0, . . . , 0", and the shift register SR2 sequentially receives 80-bit dot data "0, 0, . . . , 0" and subsequent (600+m)-bit dot data DATA2. The dot data DATA1 correspond to dot data D640 to D1 selected from the dot data for one line which are read from the print buffer 45 to the head controller 48C. The dot data DATA2 correspond to dot data D1200 to D(601+m) selected from the dot data for one line which are read from the print buffer 45 to the head controller 48C. The dot data D640 to D(601+m) assigned to the shift clocks SCK (C1 to C(40−m)) are deleted due to an overflow of the shift register SR1, and the dot data "0, 0, . . . , 0" assigned to the shift clocks SCK (C1 to C(40−m)) are deleted due to an overflow of the shift register SR2. Accordingly, the dot data "0, 0, . . . , 0" are stored in the bits R1 to R(40−m) of the line buffer, and the dot data D1 to D1200 are stored in the bits R(41−m) to R(1240−m) of the line buffer, the dot data "0, 0, . . . , 0" are stored in the bits R(1241−m) to R1280 of the line buffer.

Further, a positional error in the sub-scanning direction P is corrected by controlling the printing timings of the printing head 21Y, 21M, 21C and 21B. The printing head 22B, 22C, 22M and 22Y begin to be driven when an available area of the paper reaches the printing head 21B, 21C, 21M and 21Y, respectively. The timer counter 52 stores first, second, third and fourth numbers of paper feeding steps as print control data which are determined according to the distances from the position sensor 29 to the printing heads 22B, 22C, 22M and 22Y. In the color printer 20, the position sensor 29 and the printing heads are spaced from each other by a distance of 1000 dots, five driving pulses are supplied to the pulse motor of the fed motor unit 48 in order to feed paper by one dot in the sub-scanning direction P. Accordingly, the timer counter 52 initially has the first, second, third, and fourth print control data of 5000 steps, 10000 steps, 15000 steps, and 20000 steps indicating the first, second, third and fourth numbers of paper feeding steps.

If there is no positional error in the sub-scanning direction P, the CPU 42 drives the timer counter 52 in response to an interruption signal supplied from the position sensor 29. The CPU 42 causes the head controller 48B to drive the printing head 22B in response to an interruption signal produced from the timer counter 52 upon counting 5000th step of paper feeding, the head controller 48C to drive the printing head 22C in response to an interruption signal produced from the timer counter 52 upon counting 10000th step of paper feeding,. the head controller 48M to drive the printing head 22M in response to an interruption signal produced from the timer counter 52 upon counting 15000th step of paper feeding, and the head controller 48Y to drive the printing head 22Y in response to an interruption signal produced from the timer counter 52 upon counting 20000th step of paper feeding.

In the correction process illustrated in FIG. 12, the second, third and fourth print control data items are updated to correct the positional errors of the printing unit 21C, 21M and 21Y. with respect to the printing unit 21B in the sub-scanning direction P. The timing of starting the printing head 22C only will be explained. The timing of any other printing head used will not be described.

When the positional error of the printing head 22C in the sub-scanning direction P is, for example, of −6 dots. In this case, the number of paper feeding steps, set in the timer counter 52, is changed to 10030 (=10000+(6×5)) to correct this positional error. The CPU 42 causes the head controller 48C to start driving the pint head 22C in response to an interruption signal produced from the timer counter 52 upon counting the 10030th step of paper feeding. The printing position of the printing head 22C is thereby shifted by +6 dots away from the printing head 22B in the sub-scanning direction P.

When the positional error of the printing head 22C in the sub-scanning direction P is, for example, of +6 dots, the number of paper feeding steps, set in the timer counter 52, is changed to 9070 (=10000−(6×5)) to correct the positional error. The CPU 42 causes the head controller 48C to start driving the pint head 22C in response to an interruption signal produced from the timer counter 52 upon counting the 90670th step of paper feeding. The printing position of the printing head 22C is thereby shifted by −6 dots toward the printing head 22B in the sub-scanning direction P.

Figure 16:
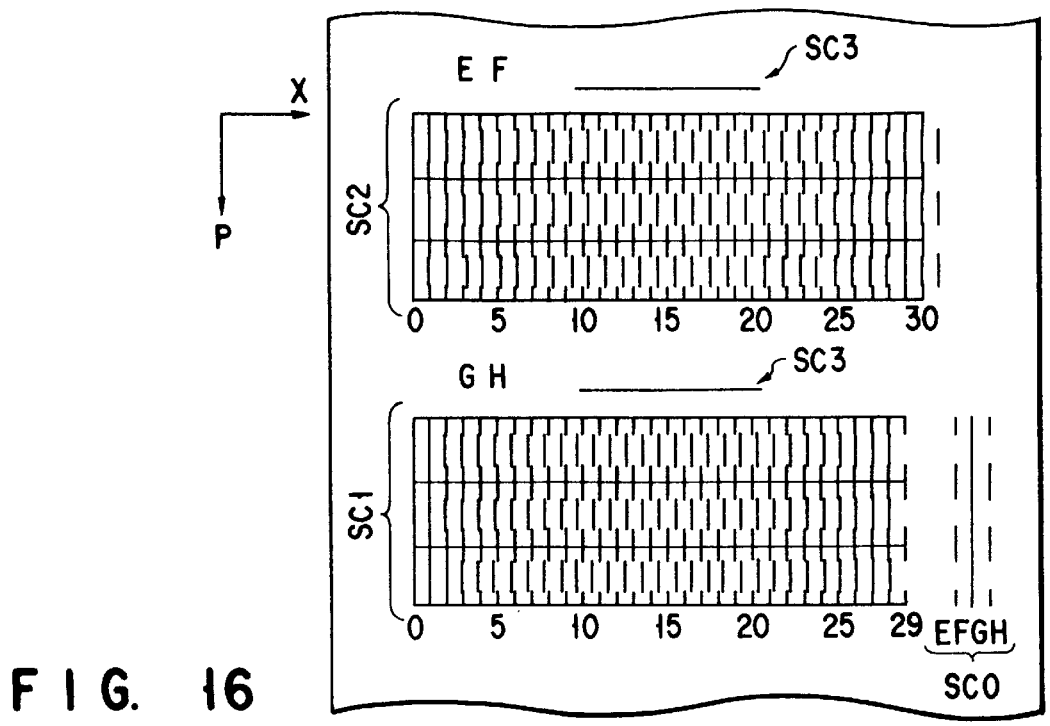
FIG. 16 is a view showing a deviation test pattern actually printed to measure a positional error in the main-scanning direction after execution of the correction process shown in FIG. 12.
Figure 17:
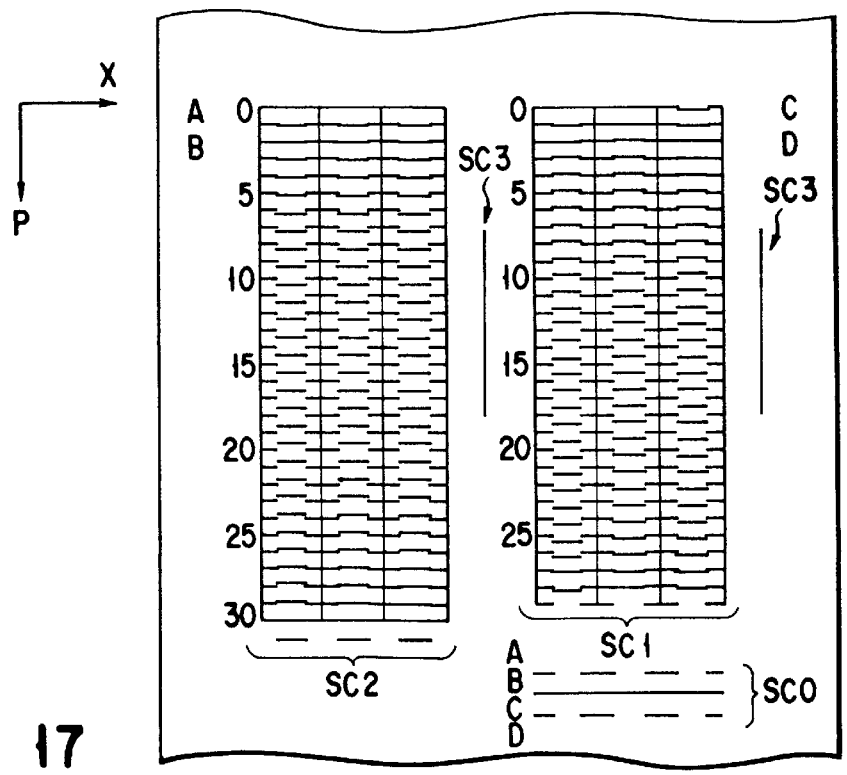
FIG. 17 is a view showing a deviation test pattern actually printed to measure a positional error in the sub-scanning direction after execution of the correction process shown in FIG. 12.

When the deviation test patterns for the main-scanning direction X and the sub-scanning direction P are printed again after the correction process shown in FIG. 12, the operator can confirm that the positional errors have been actually corrected as illustrated in FIGS. 16 and 17.

In the color printer 20 of the present embodiment, the ROM 32 stores first and second test printing data stored in the ROM 32 and respectively defining the deviation test patterns for the main-scanning direction X and the sub-scanning direction P. the printer 20 actually prints both deviation test patterns in the test mode. Each pattern printed includes a reference scale and a difference scale arranged in parallel to the reference scale. The reference scale is comprised of a plurality of reference-scale bars which have been printed by the printing unit 21B and which are juxtaposed at a first pitch in the deviation-measuring direction. The difference scale is comprised of difference-scale bars which have been printed by the printing units 21C, 21M and 21Y and juxtaposed at a second pitch in the deviation-measuring direction. The second pitch differs by one dot from the first pitch. The operator examines each deviation test pattern and finds a reference-scale bar which aligns with one of the difference-scale bars. From the position of the reference-scale bar found, the operator determines the printing position errors of the printing units 21C, 21M and 21Y in the deviation-measuring direction with respect to the printing unit 21B. For the operator it is easy to determine the positional errors because the errors are obvious from the positional relation between the reference-scale bars on the one hand and the difference-scale bars on the other. The operator need not use a microscope to determine the positional errors, he or she can measure the errors more quickly and more accurately. That is, the strain and fatigue on the operator and measuring time can be reduced. The operator simply operates the keyboard 37 to input correction data as a result of measurement, since the color printer 20 is capable of correcting the positional errors in accordance with the correction data input from the keyboard 37. In addition, the positional errors can be measured to the accuracy of one dot since the pitch of the reference-scale bars and that of the difference-scale bars differ by one dot from each other.

Figure 18:
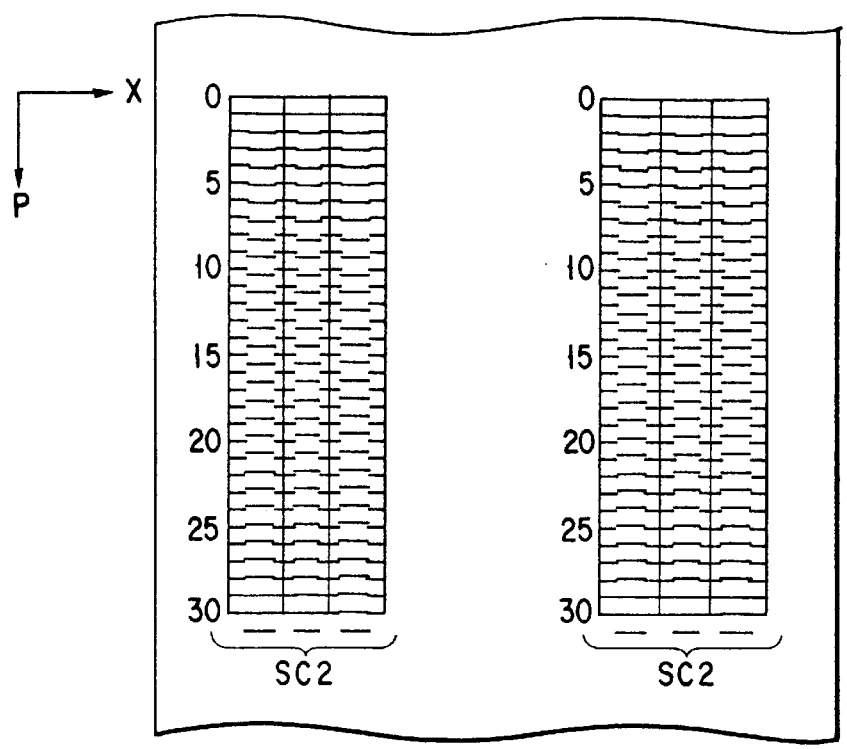
FIG. 18 is a view showing a deviation test pattern used for confirming that thermal printing heads shown in FIG. 3 are set in parallel with each other and extend in the main-scanning direction.

In the present embodiment, the deviation test pattern for the sub-scanning direction P consists of a schematic scale section SC0, a pair of detailed scale sections SC1 and SC2. The detailed scale sections SC1 and SC2 can be used to detect a slant of the row of heat-generating elements of each printing heads 22Y, 22M, 22C and 22B. In this case, the control circuit is constructed to perform a control of forming a pair of detailed scale sections SC2 (or a pair of detailed scale sections SC1) near sides of the paper in the main-scanning direction X so that they can be sufficiently separated from each other, as illustrated in FIG. 18. The operator examines the first detailed scale SC2 and finds a reference-scale bar which aligns with one of the difference-scale bars. Then, he or she examines the second detailed scale SC2 and finds a reference-scale bar which aligns with one of the difference-scale bars. From the positions the reference-scale bars found, the operator determine the slanted angle of the row of heat-generating elements of each printing heads 22Y, 22M, 22C and 22B. The slant of the row of the heat-generating elements can be eliminated by changing the positions of the dots contained in the dot-image pattern which is produced in, for example, the RAM 33.

A color printer 61 according to another embodiment of the invention will be described, with reference to FIGS. 19 to 23.

This color printer 61 is identical to the color printer 20 described above, except that it has components which cooperate to automatically determine the printing position errors in the main-scanning direction X and the sub-scanning direction P. The components identical or similar to those of the printer 20 are designated at the same numerals and will not be described in detail.

Figure 19:
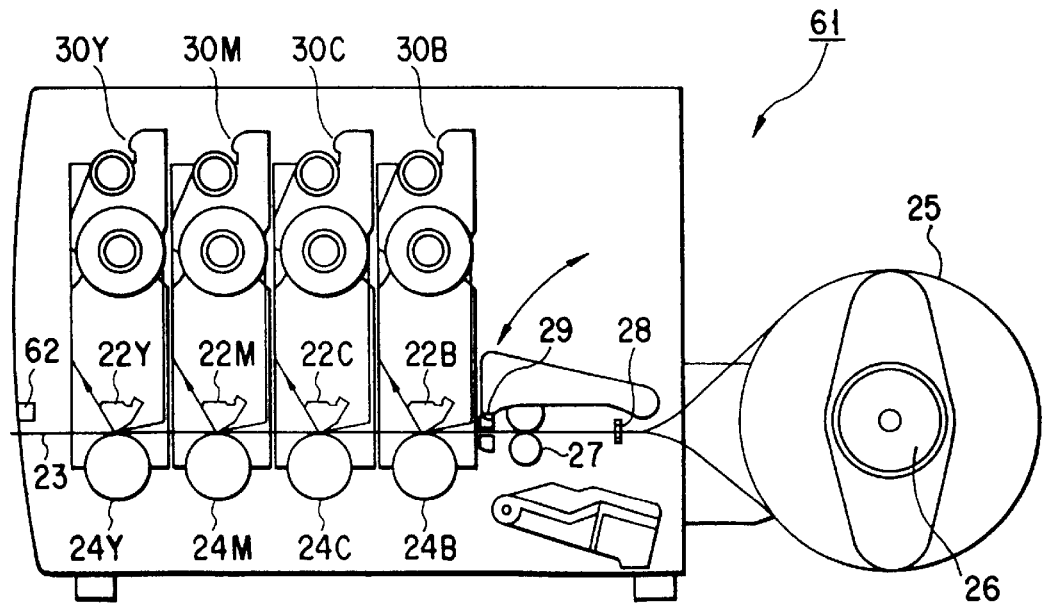
FIG. 19 is a view schematically showing the internal structure of a color printer according to another embodiment of the present invention.

FIG. 19 shows the internal structure of the color printer 61, and FIG. 20 shows the control circuit of the printer 61.

As shown in FIG. 19, the printer 61 has a CCD (Charge-Coupled Device) image sensor 62 disposed near the exit of the paper feed path. The paper which has been processed by the printing units 21B, 21C, 21M and 21Y in the test mode is discharged from the exit. The sensor 62 reads each of the color images of two deviation test patterns for the main-scanning direction X and the sub-scanning direction P. The color image is supplied to the input and output port 34 and stored in the RAM 33. The control programs of the CPUs 31 and 42 are changed to automatically measure the printing position errors of the printing unit 21C, 21M and 21Y with respect to the printing unit 21B.

In the test mode, the control circuit of the color printer 61 performs test printing process in step ST30 and then performs correction process in step ST31, as is illustrated in FIG. 21.

FIG. 22 shows the test printing process illustrated in FIG. 21. In this test printing process, the CPU 31 performs in step ST35 a pre-processing related to the deviation test pattern for the main-scanning direction X. In this pre-processing, the CPU 31 reads the first test printing data stored in the ROM 32, and produces, in the RAM 33, dot image data of the four color components corresponding to the first test printing data and print control data designating a predetermined print size and a predetermined print format.

Moreover, the CPU 31 performs in step ST36 a pre-processing related to the deviation test pattern for the sub-scanning direction P. In this pre-processing, the CPU 31 reads the second test printing data stored in the ROM 32, and produces, in the RAM 33, dot image data of the four color components corresponding to the second test printing data and print control data designating a predetermined print size and a predetermined print format.

In step ST37, the CPU 42 performs a pattern printing process of reading, from the RAM 33 via the dual port RAM 41, dot image data of the four color components which are assigned to the deviation test pattern for the main-scanning direction X, and controlling the printing units 21Y, 21M, 21C and 21B as in the same manner as the normal mode to print four color component images corresponding to the dot image data which are overlaid to obtain the deviation test pattern for the main-scanning direction X.

In step ST38, the CPU 42 performs a pattern printing process of reading, from the RAM 33 via the dual port RAM 41, dot image data of the four color components which are assigned to the deviation test pattern for the sub-scanning direction P, and controlling the printing units 21Y, 21M, 21C and 21B as in the same manner as the normal mode to print four color component images corresponding to the dot image data which are overlaid to obtain the deviation test pattern for the sub-scanning direction P.

Figure 23:
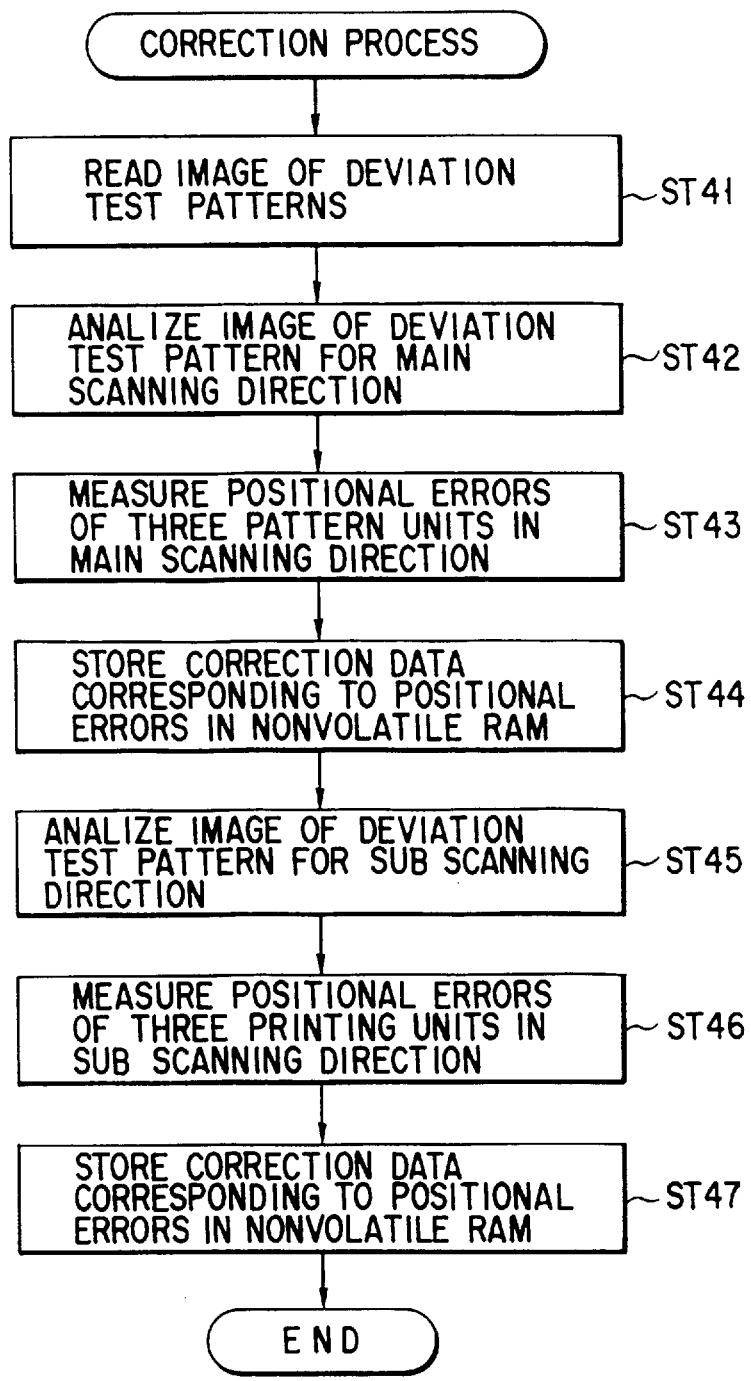
FIG. 23 is a flowchart of a correction process shown in FIG. 21.

FIG. 23 shows the correction process illustrated in FIG. 22, in detail. In step ST41, the CPU 31 causes the CCD image sensor 62 to sequentially read the images of two deviation test patterns for the main-scanning direction X and the sub-scanning direction P. In step ST42, the CPU 31 analyzes the image of the main-scanning direction X. In step ST43, the CPU 31 determines from the results of analysis the positional errors of the printing units 21Y, 21M and 21C with respect to the printing unit 21B in the main-scanning direction X. In step ST44, the CPU 31 stores correction data corresponding to the positional errors, into the nonvolatile RAM 51. Thereafter, in step ST45, the CPU 31 analyzes the image of the sub-scanning direction P. In step ST46, the CPU 31 determines from the results of analysis the positional errors of the printing units 21Y, 21M and 21C with respect to the printing unit 21B in the sub-scanning direction P. In step ST47, the CPU 31 stores correction data corresponding to the positional errors, into the nonvolatile RAM 51.

After completing the correction process shown in FIG. 23, the control circuit performs the correction process shown in FIG. 12. Accordingly, the initial print control data stored in the timer counter 52 and timer counters 47Y, 47M and 47C are changed in accordance with the correction data stored in the nonvolatile RAM 51.

The color printer 61 attains the same advantages as the color printer 20 and makes it unnecessary for an operator to measure the positional errors. The printer 61 can therefore reduce the strain and fatigue on the operator and time required for measuring the positional errors.

In the embodiment described above, the printing units 21Y, 21M, 21C and 21B use ink ribbon and have a thermal printing head to print images. The present invention is not limited to these embodiments. Rather, the printing units 21Y, 21M, 21C and 21B may have an ink-jet printing head to print images. Alternatively, they may have a photosensitive drum each of which undergoes electrophotographic process.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A deviation test pattern comprising:
    a reference scale printed by one reference printing unit among a plurality of printing units arranged to print overlaid images, said reference scale having a plurality of scale bars arranged in a deviation-measuring direction at a pitch M;
    a difference scale printed adjacent to and in parallel to said reference scale by a printing unit other than said reference printing unit, said difference scale having a plurality of scale bars arranged in the deviation-measuring direction at a pitch N which slightly differs from the pitch M; and
    a sub-scale section including a reference bar printed by said reference printing unit and a difference bar printed by said other printing unit, said reference and difference bars of said sub-scale section being set to be perpendicular to said scale bars and in alignment with each other.

2. A deviation test pattern according to claim 1, wherein said plurality of printing units is arranged in a paper feeding direction, and said deviation-measuring direction is set perpendicular to the paper feeding direction.

3. A deviation test pattern according to claim 1, wherein said plurality of printing units is arranged in a paper feeding direction, and said deviation-measuring direction coincides with the paper feeding direction.

4. A deviation test pattern according to claim 1, wherein a difference between the pitch M and the pitch N corresponds to one dot of an image printed by each of said reference printing unit and said other printing unit.

5. A deviation test pattern comprising:
    a first detailed scale section comprised of:
        a reference scale printed by one reference printing unit among a plurality of printing units arranged to print overlaid images, and said reference scale having a plurality of scale bars arranged in a deviation-measuring direction at a pitch M, and a difference scale printed adjacent to and in parallel to said reference scale by a printing unit other than said reference printing unit, and said difference scale having a plurality of scale bars arranged in the deviation-measuring direction at a pitch N which is shorter than the pitch M by a predetermined length; and a second detailed scale section comprised of:

a second reference scale printed by said reference printing unit, and said second reference scale having a plurality of scale bars arranged at a pitch M in the deviation-measuring direction, and a second difference scale printed adjacent to and in parallel to said reference scale by the printing unit other than said reference printing unit, and said second difference scale having a plurality of scale bars arranged in the deviation-measuring direction at a pitch L which is longer than the pitch M by a predetermined length.

6. A deviation test pattern according to claim 5, further comprising:

a schematic scale section comprised of:

a schematic reference scale printed by said reference printing unit and having a plurality of scale bars arranged in the pitch M in the deviation-measuring direction, and a schematic scale bar printed adjacent to and in parallel to said reference scale by the printing unit other than said reference printing unit, and set to be in alignment with a central scale bar of said schematic reference scale.

7. A deviation test pattern according to claim 5, wherein said plurality of printing units is arranged in a paper feeding direction, and said deviation-measuring direction is set perpendicular to the paper feeding direction.

8. A deviation test pattern according to claim 5, wherein said plurality of printing units is arranged in a paper feeding direction, and said deviation-measuring direction coincides with the paper feeding direction.

9. A deviation test pattern according to claim 5, wherein a difference between the pitch M and the pitch N corresponds to one dot of an image printed by each of said printing units.

10. A printer device comprising:

a plurality of printing units arranged to print overlaid images; and a print control circuit for controlling said printing units to print the overlaid images;

wherein said print control circuit comprises a test control circuit including:

means for controlling one reference printing unit among said plurality of printing units in a test mode to print a reference scale having a plurality of scale bars arranged in a deviation-measuring direction at a pitch M, and a printing unit other than said reference printing unit in the test mode to print a difference scale adjacent to and in parallel to said reference scale and having a plurality of scale bars arranged in the deviation measuring direction at a pitch N which slightly differs from the pitch M; and means for controlling said reference printing unit and said other printing unit in the test mode to print a reference bar and a difference bar which are set to be perpendicular to said scale bars and in alignment with each other and to serve as a sub-scale section, thereby obtaining a deviation test pattern.

11. A printer device comprising:

a plurality of printing units arranged to print overlaid images; and a print control circuit for controlling said printing units to print the overlaid images;

wherein said print control circuit has a test control circuit including:

means for controlling in a test mode one reference printing unit among a plurality of printing units to print a reference scale having a plurality of scale bars arranged in a deviation-measuring direction at a pitch M, and a printing unit other than said reference printing unit to print a difference scale adjacent to and in parallel to said reference scale and having a plurality of scale bars arranged in the deviation-measuring direction at a pitch N which is shorter than the pitch M by a predetermined length, thereby forming a first detailed scale section; and means for controlling in the test mode said reference printing unit to print a reference scale having a plurality of scale bars arranged at a pitch M in the deviation-measuring direction, and said other printing unit to print a difference scale adjacent to and in parallel to said reference scale having a plurality of scale bars arranged in the deviation-measuring direction at a pitch L which is longer than the pitch M by a predetermined length, thereby forming a second detailed scale section associated with said first detailed scale section to obtain a deviation test pattern.

12. A printer device according to claim 11, wherein said plurality of printing units is arranged in a paper feeding direction, and said deviation-measuring direction is set perpendicular to the paper feeding direction.

13. A printer device according to claim 11, wherein said plurality of printing units is arranged in a paper feeding direction, and said deviation-measuring direction coincides with the paper feeding direction.

14. A printer device according to claim 11, wherein a difference between the pitch M and the pitch N corresponds to one dot of an image printed by each of said printing units.

15. A printer device according to claim 11, wherein:

said plurality of printing units includes a line printing head set perpendicular to the paper feeding direction;

said deviation-measuring direction coincides with the paper feeding direction; and said test control circuit includes means for performing a control of forming a pair of the deviation test pattern near sides of paper in a direction perpendicular to the paper feeding direction.

16. A printer device comprising:

a plurality of printing units arranged to print overlaid images; and a print control circuit for controlling said printing units to print the overlaid images;

wherein said print control circuit includes a test control circuit for controlling one reference printing unit among said plurality of printing units in a test mode to print a reference scale having a plurality of scale bars arranged in a deviation-measuring direction perpendicular to a paper feeding direction at a pitch M, controlling a printing unit other than said reference printing unit in the test mode to print a difference scale adjacent to and in parallel to the reference scale and having scale bars arranged in the deviation-measuring direction at a pitch N, which slightly differs from the pitch M, measuring a deviation of a printing position of said other printing unit with respect to a printing position of said reference printing unit in the deviation-measuring direction from a deviation test pattern formed of said reference scale and said difference scale, and changing the printing position of said other printing unit in accordance with a result of the measurement.

17. A printer device according to claim 16, wherein said print control circuit further includes a second test control circuit for controlling one reference printing unit among said plurality of printing units in a test mode to print a reference scale having a plurality of scale bars arranged in anther deviation-measuring direction at a pitch M, controlling a printing unit other than said reference printing unit in the test made to print a difference scale adjacent to and in parallel to the reference scale and having scale bars arranged in the other deviation-measuring direction at a pitch N, which slightly differs from the pitch M, measuring a deviation of a printing position of said other printing unit with respect to a printing position of said reference printing unit in the other deviation-measuring direction from a second deviation test pattern formed of said reference scale and said difference scale, and changing the printing position of said other printing unit in accordance with a result of the measurement.

* * * * *